US006665294B2

(12) United States Patent
Christie

(10) Patent No.: US 6,665,294 B2
(45) Date of Patent: Dec. 16, 2003

(54) BROADBAND TELECOMMUNICATIONS SYSTEM

(75) Inventor: Joseph Michael Christie, San Bruno, CA (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 10/212,503

(22) Filed: Aug. 5, 2002

(65) Prior Publication Data
US 2003/0002491 A1 Jan. 2, 2003

Related U.S. Application Data

(63) Continuation of application No. 09/438,669, filed on Nov. 12, 1999, now Pat. No. 6,452,928, which is a continuation-in-part of application No. 08/568,551, filed on Dec. 7, 1995, now Pat. No. 5,825,780, and a continuation of application No. 08/525,897, filed on Sep. 8, 1995, now Pat. No. 5,991,301, and a continuation of application No. 08/238,605, filed on May 5, 1994, now abandoned.

(51) Int. Cl.[7] .............................................. H04L 12/66
(52) U.S. Cl. ...................... 370/352; 370/410; 370/466; 370/395.1
(58) Field of Search ................................. 370/351–356, 370/395.1, 396, 397, 398, 399, 400, 401, 410, 426, 465, 466, 467; 379/219, 220.01

(56) References Cited

U.S. PATENT DOCUMENTS

| 4,201,889 A | 5/1980 | Lawrence et al. |
| 4,348,554 A | 9/1982 | Asmuth |
| 4,453,247 A | 6/1984 | Suzuki et al. |
| 4,720,850 A | 1/1988 | Oberlander et al. |
| 4,748,658 A | 5/1988 | Gopal et al. |
| 4,763,317 A | 8/1988 | Lehman et al. |
| 4,926,416 A | 5/1990 | Weik |
| 5,051,983 A | 9/1991 | Kammerl |
| 5,067,123 A | 11/1991 | Hyodo et al. |
| 5,084,867 A | 1/1992 | Tachibana et al. |
| 5,089,954 A | 2/1992 | Rago |
| 5,115,427 A | 5/1992 | Johnson, Jr. et al. |
| 5,179,556 A | 1/1993 | Turner |
| 5,182,550 A | 1/1993 | Masuda et al. |
| 5,204,857 A | 4/1993 | Obara |
| 5,218,602 A | 6/1993 | Grant et al. |
| 5,251,255 A | 10/1993 | Epley |
| 5,255,266 A | 10/1993 | Watanabe et al. |
| 5,289,536 A | 2/1994 | Hokari |
| 5,291,492 A | 3/1994 | Andrews et al. |
| 5,327,421 A | 7/1994 | Hiller et al. |
| 5,339,318 A | 8/1994 | Tanaka et al. |
| 5,345,445 A | 9/1994 | Hiller et al. |
| 5,345,446 A | 9/1994 | Hiller et al. |
| 5,365,524 A | 11/1994 | Hiller et al. |
| 5,384,771 A | 1/1995 | Isidoro et al. |

(List continued on next page.)

FOREIGN PATENT DOCUMENTS

| JP | 4154230 | 5/1992 |
| JP | 8149137 | 6/1996 |
| JP | 08-505988 | 6/1996 |
| WO | WO 95/31057 | 11/1995 |

OTHER PUBLICATIONS

McDysan, David E. and Spohn, Darren L., ATM Theory And Application, 1994, p. 256: 9.3.1; ATM Layer VPI/VCI Level Addressing.

(List continued on next page.)

Primary Examiner—Ajit Patel

(57) ABSTRACT

The invention is a system for providing virtual connections through an ATM interworking multiplexer on a call-by-call basis. A signaling processor receives signaling for a call and selects the virtual connection for the call. The signaling processor generates new signaling that identifies the selection and transfers the new signaling to the ATM interworking multiplexer that accepted the access connection for the call. The multiplexer converts user information from the access connection into ATM cells for transmission over the virtual connection in accord with the new signaling.

36 Claims, 12 Drawing Sheets

U.S. PATENT DOCUMENTS

| | | |
|---|---|---|
| 5,392,402 A | 2/1995 | Robrock, II |
| 5,414,701 A | 5/1995 | Shtayer et al. |
| 5,420,857 A | 5/1995 | Jurkevich |
| 5,420,858 A | 5/1995 | Marshall et al. |
| 5,422,882 A | 6/1995 | Hiller et al. |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | LaPorta et al. |
| 5,434,981 A | 7/1995 | Lenihan et al. |
| 5,446,738 A | 8/1995 | Kim et al. |
| 5,452,296 A | 9/1995 | Shimizu |
| 5,452,297 A | 9/1995 | Hiller et al. |
| 5,459,721 A | 10/1995 | Yoshida |
| 5,459,722 A | 10/1995 | Sherif |
| 5,461,669 A | 10/1995 | Vilain |
| 5,469,501 A | 11/1995 | Otsuka |
| 5,473,677 A | 12/1995 | D'Amato et al. |
| 5,473,679 A | 12/1995 | LaPorta et al. |
| 5,483,527 A * | 1/1996 | Doshi et al. ............... 370/399 |
| 5,495,484 A | 2/1996 | Self et al. |
| 5,504,742 A | 4/1996 | Kakuma et al. |
| 5,509,010 A * | 4/1996 | La Porta et al. ............ 370/397 |
| 5,513,178 A | 4/1996 | Tanaka |
| 5,568,475 A * | 10/1996 | Doshi et al. ............... 370/399 |
| 5,623,491 A * | 4/1997 | Skoog ....................... 370/397 |

OTHER PUBLICATIONS

Ohta, S., et al., A Dynamically Controllable ATM Transport Network Based On The Virtual Path Concept, Pp. 1272–1276, Communications For The Information Age, Globecom '88, Conference Record, vol. III, Nov. 28–Dec. 1, 1988.

Chiang, "Proposed Changes To Proxy Signaling Capability", ATM Forum Signaling Working Group 95–0046, Feb. 6–10, 1995.

Amin–Salehi, "Third Party Call Setup For A Video–On–Demand Connection Establishment", ATM Forum Technical Committee 95–0022, Feb. 5–8, 1995.

Andrews, F., "Switching In A Competitive Market," IEEE Communications Magazine, Jan.–91.

Atoui, M., "Virtual Private Network Call Processing In The Intelligent Network," pp. 561–565, Chicago, IL, International Conference on Communications, vol. II., 1992.

Barr, W.J., et al., The TINA Initiative, IEEE Communications Magazine, vol. 31, No. 3, New York (US), pp. 70–76, Mar. 1993.

Weisser, F. J., et al., The Intelligent Network And Forward--Looking Technology, IEEE Communications Magazine, vol. 26, No. 12, Dec. 1988, New York (US), pp. 64–69, Dec. 1988.

"IN/B–ISDN Signaling Three Ways Of Integration," Study Group 11, Geneva, ITU—Telecommunication Standardization Sector, Nov. 29–Dec. 17, 1993.

"Chapter 6 Of Recommendation Q.93B," Study Group 11, Geneva, ITU—Telecommunication Standardization Sector, Nov. 29–Dec. 17, 1993.

"Annex E Of Recommendation Q.93B," Study Group 11, ITU—Telecommunication Standardization Sector, Nov. 29–Dec. 17, 1993.

General Recommendations On Telephone Switching And Signaling Intelligent Network—Intelligent Network Distributed Functional Plane Architecture, Q.1204, ITU–T—Mar. 1993.

General Recommendations On Telephone Switching And Signaling Intelligent Network–Intelligent Network Physical Plane Architecture Q.1205, ITU–T Recommendation, Telecommunication Standardization Sector of ITU.

"General Recommendations On Telephone Switching And Signaling—Intelligent Network/Distributed Functional Plane For Intelligent Network CS–1," ITU–T Recommendation Q.1214, ITU—Telecommunication Standardization Sector.

"Revised Draft Of Q.2650 (DSS2/B–ISUP Interworking Recommendation)," Study Group 11, Geneva, ITU—Telecommunication Standardization Sector, Nov. 29–Dec. 17, 1993.

ITU—Telecommunication Standardization Sector, Study Group 13, "Draft Revised Recommendation 1.580," Geneva, ITU—Telecommunication Standardization Sector, Study Group 13, Jul. 10–21, 1995.

"Final Draft Text For Broadband Capability Set 2 Signaling Requirements," Study Group 11 Attachment "D" Special Drafting Meeting, pp. 1–127, Torino, Italy, ITU–T Telecommunications Standardization Sector, Sep. 13–22, 1993.

"Report Of The Meeting Of SWP 13/1–4", Study Group 13, Temporary Document 46 (13/1), ITUT, Mar. 1994.

Beckman, Richard T. and Matthews, Joseph R., "Proposal For A Physical Architecture Based On The Harmonized Functional Architecture," Committee T1 Contribution T1S1.5/95–027, Bellcore,. Feb. 20, 1995.

Buhrke, Proposed Unified Functional Model, T1S1.5/95–036, Feb. 1995.

Faynberg, I., et al., "The Support Of Network Interworking And Distributed Context Switching In The In Service Data Function Model," pp. 11–16, , 2nd Colloque International, ICIN 92, March 1992.

Fukazawa, M., et al., "Intelligent Network Call Model For Broadband ISDN," pp. 30.6.1–30.6.5, Fujitsu Laboratories Ltd., Japan.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

"Network Signaling," Telephony, TCX12004, University of Excellence, pp 5.8–5.17, Oct. 21, 1991.

Kuribayashi, Shin–ichi, "Advanced Signaling Protocol for Broadband ISDN Services" Electronics and Communications in Japan, Part 1, vol. 78, No. 1, 1995, pp. 1–12.

McKinney, Scott, "ATM for Narrowband Services" IEEE Communications Magazine, Apr., 1994, New York, US, pp. 64–72.

Palmer, Rob, "An Experimental ATM Network for B–ISDN Research," IEEE 1992, Melbourne, Australia.

Palmer, Rob, "An Experimental ATM Network Featuring De–Coupled Modular Control," Telecom Australia Research Laboratories (Victoria), pp. 118–122 (Nov., 1992).

ITU–T 1.722 Specifications of Signaling System No. 7 GENERAL.

Function of Telephone Messages and Signals (Extract from the Blue Book).

Bauer, Helen, A.; Kulzer, John J.; Sable, Edward G., "Designing Service–Independent Capabilities for Intelligent Networks,".

ITU–T Q. 1219 Intelligent Network, Intelligent Network User's Guide for Capability Set 1, ITU–T Recommendation Q.1219, Apr. 1994.

Thorner, "Intelligent Network," Chapter 2, Intelligent Networks, 1994, Artech House.

Shinichi Aisawa, Sadahiko Kano (Editors) "Common Channel Signaling System," Published by Denki Tsushin Kyokai.

* cited by examiner

BROADBAND TELECOMMUNICATIONS SYSTEM

CROSS-REFERENCE TO RELATED APPLICATIONS

This application is a continuation of pending U.S. patent application Ser. No. 09/438,669, entitled "Broadband Telecommunications System," filed Nov. 12, 1999 now U.S. Pat. No. 6,452,928, which is a continuation of appln Ser. No. 08/525,897 now U.S. Pat. No. 5,991,301, filed on Sep. 8, 1995, which is incorporated by reference into this application, and which is a continuation-in-part of appln Ser. No. 08/568,551 filed Dec. 7, 1995 now U.S. Pat. No. 5,825,780 entitled "Method, System, and Apparatus for Telecommunications Control," which is incorporated by reference into this application, and which is a continuation of U.S. patent application Ser. No. 08/238,605 filed May 5, 1991, Now Abandoned.

BACKGROUND

At present, Asynchronous Transfer Mode (ATM) technology is being developed to provide broadband switching capability. Some ATM systems have used ATM cross-connects to provide virtual connections. Cross-connect devices do not have the capacity to process signaling. Signaling refers to messages that are used by telecommunications networks to set-up and tear down calls. Thus, ATM cross-connects cannot make connections on a call by call basis. As a result, connections through cross-connect systems must be pre-provisioned. They provide a relatively rigid switching fabric. Due to this limitation, ATM cross-connect systems have been primarily used to provide dedicated connections, such as permanent virtual circuits (PVCs) and permanent virtual paths (PVPs). But, they do not to provide ATM switching on a call by call basis as required to provide switched virtual circuits (SVCs) or switched virtual paths (SVPs). Those skilled in the art are well aware of the efficiencies created by using SVPs a and SVCs as opposed to PVCs and PVPs. SVCs and SVPs utilize bandwidth more efficiently.

ATM switches have also been used to provide PVCs and PVPs. Since PVCs and PVPs are not established on a call-by-call basis, the ATM switch does need to use its call processing or signaling capacity. ATM switches require both signaling capability and call processing capability to provide SVCs and SVPs. In order to achieve virtual connection switching on a call by call basis, ATM switches are being developed that can process calls in response to signaling to provide virtual connections for each call. These systems cause problems because they must be very sophisticated to support current networks. These ATM switches must process high volumes of calls and transition legacy services from existing networks. An example would be an ATM switch that can handle large numbers of POTS, 800, and VPN calls. This generation of sophisticated ATM switches is not yet mature and should be expensive when they are first deployed.

Currently, ATM multiplexers are being developed that can interwork traffic into ATM cells and multiplex the cells for transport over an ATM network. One example of an application of these muxes is provided by T1 transport over an ATM connection. Traffic that leaves the switch in T1 format is muxed into ATM cells for transport over a high speed connection. Before the cells reach another switch, they are converted back into the T1 format. Thus, the ATM mux is used for high speed transport. The ATM mux is not used to select virtual connections on a call-by-call basis. Unfortunately, there is not a telecommunications system that can provide ATM switching on a call by call basis without relying on the call processing and signaling capability of an ATM switch.

SUMMARY

The invention includes a method of operating a telecommunications system to provide a call with a virtual connection. The method is for use when a user places the call by sending signaling for the call to the telecommunications system and by transmitting user information to the telecommunications system over a particular connection. The system comprises an ATM interworking multiplexer and a signaling processor linked to the ATM interworking multiplexer. The method comprises receiving the signaling for the call into the signaling processor, processing the signaling to select the virtual connection, generating new signaling to identify the particular connection and the selected virtual connection, and then transmitting the new signaling to the ATM interworking multiplexer. The method also includes receiving the user information for the call from the particular connection into the ATM interworking multiplexer, converting the user information into ATM cells that identify the selected virtual connection in response to the new signaling, and transmitting the ATM cells over the selected virtual connection. The signaling for the call could be a call set-up message, such a Signaling System #7 (SS7) initial address message (IAM). The method could also include applying digital signal processing (DSP) to the call in the multiplexer in accord with DSP requirements selected by the signaling processor. DSP requirements could include echo control or encryption.

The invention also includes a telecommunications system to provide a call with a virtual connection in response to signaling for the call. The system comprises a signaling processor to receive and process signaling to select the virtual connection for the call, and to generate and transmit new signaling that identifies the selected virtual connection. The system includes an ATM interworking multiplexer to receive user information from a connection, convert the user information into ATM cells that identify the selected virtual connection, and transmit the ATM cells over the selected virtual connection. The system could also include an ATM cross-connect system connected to the ATM interworking multiplexer and configured to provide a plurality of virtual connections to the ATM interworking multiplexer.

The invention also includes an ATM interworking multiplexer for providing calls with virtual connections in response to signaling for each of the calls. The multiplexer comprises an access interface to receive user information for each call from a particular connection. It also includes a control interface to receive signaling for each call that identifies the particular connection and a virtual connection for that call. It also includes an ATM adaption processor to convert user information from the particular connection for each call into ATM cells that identify the virtual connection for that call. The multiplexer also includes an ATM interface to transmit the ATM cells for each call over the virtual connection. The multiplexer could include a digital signal processor to apply digital signal processing to the user information for each call. The processing could include echo control and encryption.

In various embodiments, the invention accepts calls placed over DS0 voice connections and provides virtual connections for the calls. In this way, broadband virtual connections can be provided to narrowband traffic on a call-by-call basis without requiring the call processing and signaling capability of an ATM switch.

DETAILED DESCRIPTION

For purposes of clarity, the term "connection" will be used to refer to the transmission media used to carry user traffic. The term "link" will be used to refer to the transmission media used to carry signaling. On the Figures, connections are shown by a single line and signaling links are shown by double lines.

Figure 1:
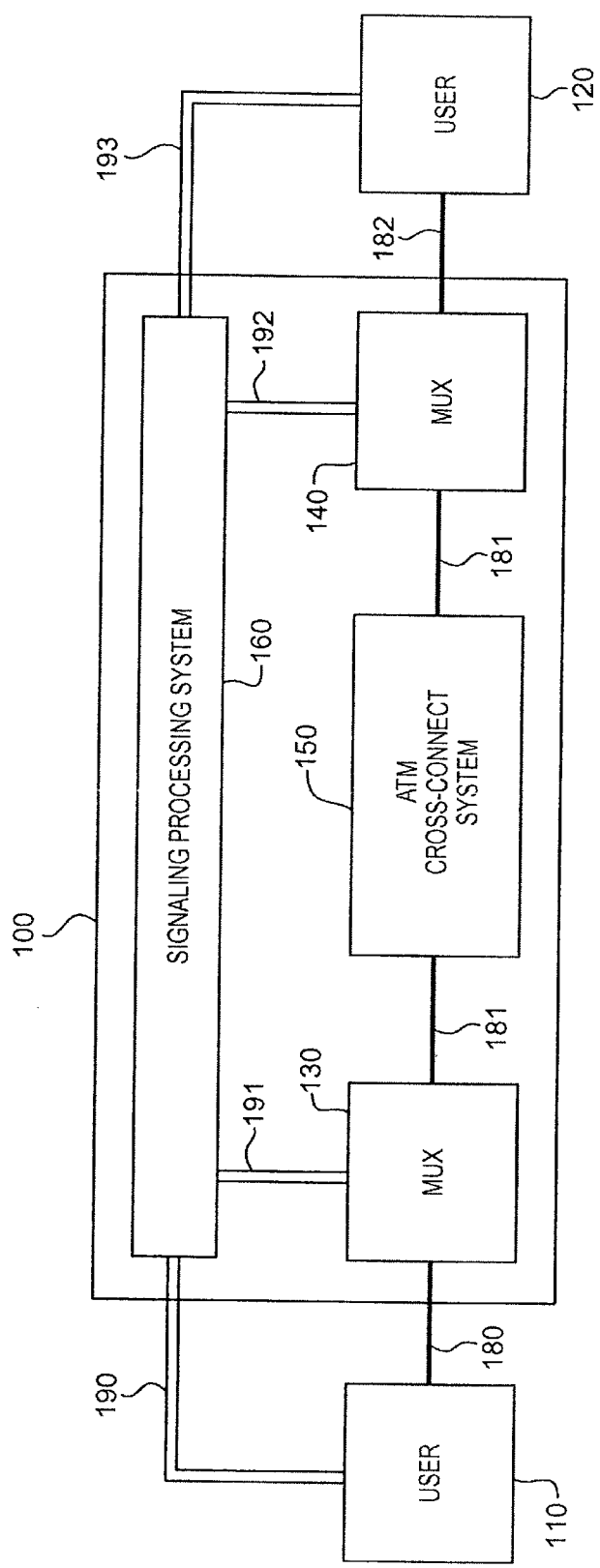
FIG. 1 is a block diagram of a version of the present invention.

FIG. 1 depicts a version of the present invention. Shown is telecommunications system 100, user 110, and user 120. Telecommunications system 100 includes ATM interworking multiplexer (mux) 130, mux 140, ATM cross-connect system 150, and signaling processing system 160. User 110 is connected to mux 130 by connection 180. Mux 130 and mux 140 are connected through cross-connect system 150 by connection 181. Mux 140 is connected to user 120 by connection 182. Signaling processing system 160 is linked to user 110 by link 190, to mux 130 by link 191, to mux 140 by link 192, and to user 120 by link 193.

Those skilled in the art are aware that large networks have many more components than are shown. For example, there would typically be a multitude of virtual connections through ATM cross-connect system 150. The number of these components has been restricted for clarity. The invention is fully applicable to a large network.

User 110 and user 120 could be any entity that supplies telecommunications traffic to network 100. Some examples would be a local exchange carrier (LEC) switch or customer premises equipment (CPE). Typically, the user traffic would be provided to system 100 in DS3. DS1. or OC-3 format that have embedded DS0 and VT 1.5 circuits. Connections 180 and 182 represent any connection that might be used by user 120 to access system 100 and would also include formats such as E1, E3, and DS2. As such, these connections are periodically referred to as access connections. Connections 180 and 182 would typically be DS0 connections embedded within a DS3 connection, however, the invention fully contemplates other connection being used with a few examples being a fractional DS1. a clear DS3. or even SONET OC-3. Links 190 and 193 are any links capable of transferring signaling messages with an example being Signaling System #7 (SS7) links. ATM cross-connect system 150 is any system that provides a plurality of virtual connections. Such a system could be comprised of individual ATM cross-connect devices interconnected by ATM connections using DS3 or SONET for transport. An example of an ATM cross-connect is the NEC Model 10. Connection 181 could be any virtual connection. Typically, the virtual connection would use DS3 or SONET for transport. ATM cross-connect system 150 would be pre-provisioned to provide a plurality of virtual connections through the cross-connect system, and virtual connection 181 represents one of these connections. As virtual connections are logical paths, many physical paths can be used based on the pre-provisioning of ATM cross-connect system 150. Links 191 and 192 could be any links capable of transporting data messages. Examples of such links could be SS7 or UDP/IP. The components described in this paragraph are known in the art.

Signaling processing system 160 is any processing platform that can receive and process signaling to select virtual connections, and then generate and transmit signaling to identify the selections. Various forms of signaling are contemplated by the invention, including SS7, C7, and user to network interface (UNI) signaling. A preferred embodiment of the signaling processor is discussed in detail toward the end of the disclosure.

Mux 130 could be any muxing system operable to place user information arriving over connection 180 on the virtual connection selected by signaling processing system 160. Typically, this involves receiving signaling messages from signaling processing system 160 that identify assignments of virtual connections to an access connection on a call by call basis. The mux would convert user traffic from access connection 180 into ATM cells that identify the selected virtual connection. Mux 140 is similar to mux 130. A preferred embodiment of these muxes are also discussed in detail below. The system would operate as follows for a call from user 110 to user 120. User 110 would send a signaling message over link 190 to system 100 initiating the call. Signaling processing system 160 would process the message. Such processing could include validation, screening, translating, route selection, echo control, network management, signaling, and billing. In particular, a virtual connection through ATM cross-connect system 150 from mux 130 to mux 140 would be selected, and a connection from mux 140 to user 120 would also be selected. Although many possible connections would be available, only the selected connections are shown—connection 181 and connection 182. Generally, the selection is based on the dialed number, but call processing can entail many other factors with a few examples being network loads and user routing instructions. Signaling processing system 160 would then send signaling reflecting the selections to mux 130 and mux 140.

User 110 would also seize a connection to system 100. The connection is represented by connection 180 to mux 130. Although, only one connection is shown for purposes of clarity, numerous connections would typically be available for seizure. The seized connection would be identified in the signaling from user 110 to system 100. Signaling processing system 160 would include the identity of this connection in its signal to mux 130.

If required, user 120 would receive signaling to facilitate completion of the call. The signaling from signaling processing system 160 would indicate that system 100 was connecting to user 120 over connection 182. Typically, user 120 would accept and acknowledge the connection in a signaling message back to system 100.

Mux 130 would receive signaling from signaling processing system 160 identifying connection 180 as the access connection and connection 181 as the selected virtual connection through ATM cross-connect system 150. Mux 130 would convert the user information from connection 180 into ATM cells. Mux 130 would designate connection 181 in the cell headers. Connection 181 would have been previously provisioned through ATM cross-connect system 150 from mux 130 to mux 140.

Mux 140 would receive signaling from signaling processing system 160 identifying connection 181 as the selected virtual connection and connection 182 as the selected access connection to user 120. Mux 140 would convert cells arriving on connection 181 to user information suitable for connection 182 to user 120. Although the above example employs two muxes, a single mux could be employed for calls that enter and exit system 100 through the same mux. In this case, the ATM system would simply provide a virtual connection back to the same mux.

From the above discussion, it can be seen that multiple virtual connections can be pre-provisioned through an ATM cross-connect system to interconnect ATM interworking multiplexers. When a user places a call, one of the virtual connections is selected for the call by the signal processing system and identified to the appropriate muxes. The muxes convert the user information into cells that identify the selected connection. As such, user information can be switched through an ATM fabric on a call by call basis. The system does not require the call processing or signaling capabilities of an ATM switch (although an ATM switch could be used to provide the virtual connections without using its call processing and signaling functions). The system can also implement enhanced services such as N00 and virtual private network (VPN).

Figure 2:
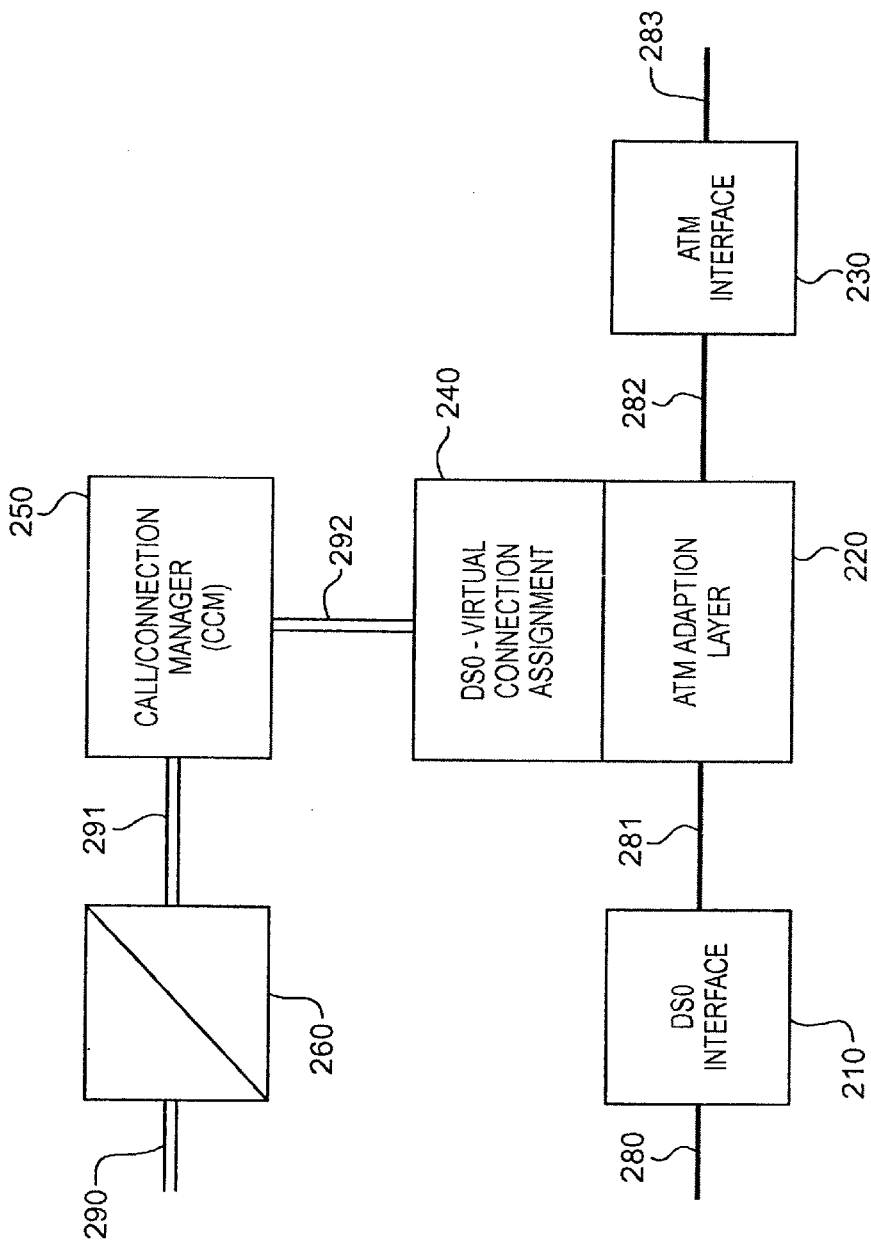
FIG. 2 is a block diagram of a version of the present invention.

FIG. 2 depicts another embodiment of the invention. In this embodiment, the user information from the access connection is capable of being muxed to the DS0 level, but this is not required in other embodiments. Additionally, SS7 signaling is used in this embodiment, but other signaling protocols, such as C7 or UNI signaling, are also applicable to the invention.

Shown are DS0 interface 210, ATM adaption layer (AAL) 220, ATM interface 230, DS0—virtual connection assignment 240, call/connection manager (CCM) 250 and signal transfer point (STP) 260. Also shown are connections 280–283 and links 290–292.

Connection 280 could by any connection or group of connections that contain information that can be converted to DS0 format. Examples of these connections are OC-3, VT 1.5, DS3. and DS1. DS0 interface 210 is operable to convert user information in these formats into the DS0 format. AAL 220 comprises both a convergence sublayer and a segmentation and reassembly (SAR) layer. AAL 220 is operational to accept the user information in DS0 format from DS0 interface 210 and convert the information into ATM cells. AALs are known in the art and information about AALs is provided by International Telecommunications Union (ITU) document I.363.1. An AAL for voice is also described in patent application Ser. No. 08/395,745, filed on Feb. 28, 1995, entitled "Cell Processing for Voice Transmission", and hereby incorporated by reference into this application. ATM interface 230 is operational to accept ATM cells and transmit them over connection 283. Connection 283 is a standard DS3 or SONET connection transporting ATM cells. Connection 281 is operational for the DS0 format and connection 282 is operational to transfer ATM cells.

It can be seen that a communications path through connections 280–283 could be established to carry user information. Although the communications path has been described from connection 280 to connection 283, the invention contemplates components that are also operational to perform reciprocal processing in the reverse direction. If the communications path is bi-directional, user information in ATM cells arriving on connection 283 would be processed for output on connection 280 in the appropriate format. Those skilled in the art will appreciate that separate connections could also be set up in each direction, or that only a connection in one direction may be required. These components and their operation are known in the art.

Signaling links 290 and 291 are SS7 links. Link 292 is a data link with an example being an ethernet connection transporting UDP/IP. STP 260 is device that routes signaling messages. STPs are well known in the art. CCM 250 would be identified by its own signaling point code. STP 260 would route signaling messages addressed to this point code to CCM 250. In some embodiments, STP 260 may also convert other point codes to the point code for CCM 250 so these signaling messages are also routed to CCM 250. Although point code conversion is not essential, it facilitates the transition of a network to the system of the invention. The conversion could be implemented through a conversion table located between level 2 and level 3 of the message transfer part (MTP) function of STP 260. The conversion table would convert the destination point code of the message to that of CCM 250, so that the route function of MTP 3 would forward the message to CCM 250. Point code conversion could be based on many factors with a few examples being the destination point code, the origination point code, the signaling link, the circuit identification code, the message type, and various combinations of these and other factors. For example, SS7 Integrated Services User Part (ISUP) messages with particular OPC/DPC combinations could have the DPC converted to the point code of CCM 250. These signaling messages would then be routed to CCM 250 by STP 260. One version of a suitable STP is disclosed in United States patent application entitled "Telecommunications Apparatus, System, and Method with Enhanced Signal Transfer Point", filed simultaneously with this application, assigned to the same entity, and hereby incorporated by reference into this application. CCM 250 is a signaling processor that operates as discussed above. A preferred embodiment of CCM 250 is provided later. In this embodiment CCM 250 would be operable to receive and process SS7 signaling to select connections, and to generate and transmit signaling identifying the selections.

Assignment 240 is a control interface that accepts messages from CCM 250. In particular, assignment 240 identifies DS0/virtual connection assignments in the messages from link 292. These assignments are provided to AAL 220 for implementation. As such, AAL 220 obtains the virtual path identifier (VPI) and virtual channel identifier (VCI) for each call from assignment 240. AAL 220 also obtains the identity of the DS0 for each call (or the DS0s for an N×64 call). AAL 220 then converts user information between the identified DS0 and the identified ATM virtual connection. Acknowledgments that the assignments have been implemented may be sent back to CCM 250 if desired.

In operation, calls are processed as follows. Signaling messages for calls arrive on link 290 and are routed by STP 260 to CCM 250. Access connections are typically seized contemporaneously with the signaling. All of these connections are represented by connection 280. DS0 interface 210 would convert the traffic on connection 280 into the DS0 format and provide the DS0s to AAL 220 over connection 281.

The signaling received by CCM 250 would identify the access connections for the calls (i.e. the particular DS0s on connection 280), and contain call information, such as a dialed number. CCM 250 would process the signaling and select connections for the call. Since multiple virtual connections are pre-provisioned from ATM interface 230 to the other destinations in the network, CCM 250 can select a virtual connection to the destination. The selection process can be accomplished through table look-ups. For example, a table could be used to translate a portion of the dialed number into a VPI. The VCI would be selected based on the available VCIs in the selected VPI. The VPI/VCI combination would correspond to a unique virtual connection pre-provisioned from ATM interface 230 to the appropriate network destination. The selections represent the DS0—virtual connection assignments that are provided to assignment 240 over link 292.

Assignment 240 accepts the DS0—virtual connection assignments and provides them to AAL 220. When AAL 220 receives a particular assignment, it converts user information from the designated DS0 into cells that identify the designated VPI/VCI. The cells are provided to ATM interface 230 over connection 282. ATM interface 230 accepts the cells and places them within the transport format for connection 283. The cells are then transported over the selected virtual connection to the appropriate destination.

Calls also exit the network through connection 280. In this case, CCMs at the origination points select the virtual connections to ATM interface 230. The originating CCMs also send signaling messages to CCM 250. The signaling messages identify the destinations for the calls and the selected virtual connections. CCM 250 will have a list of available access connections to the identified destinations. CCM 250 will select the access connections to the destination from the list. For example, the connection selected by CCM 250 could be a DS0 embedded within a DS3 connected to a LEC. The virtual connections on connection 283 and selected access connections on connection 280 are provided to assignment 240 over link 292. Assignment 240 provides these assignments to AAL 220.

ATM interface 230 will demux the cells arriving from connection 283 and provide them to AAL 220. AAL 220 converts the user information in the cells into the DS0 format. AAL 220 make the conversion so that cells from a particular virtual connection are provided to the assigned DS0 on connection 281. DS0 interface will convert the DS0s from connection 281 into the appropriate format, such as DS3. for connection 280. Those skilled in the art are aware of the techniques for muxing and transporting DS0 signals.

From the above discussion, it can be seen that user information for calls can flow from connection 280 to connection 283, and in the reverse direction from connection 283 to connection 280. DS0 interface 210 and ATM interface 230 provide user information in their respective formats to AAL 220. AAL 220 converts the user information between DS0 and ATM formats based on the assignments from assignment 240. CCM 250 can select the DS0—virtual connection assignments that drive the process.

The ATM Interworking Multiplexer

Figure 3:
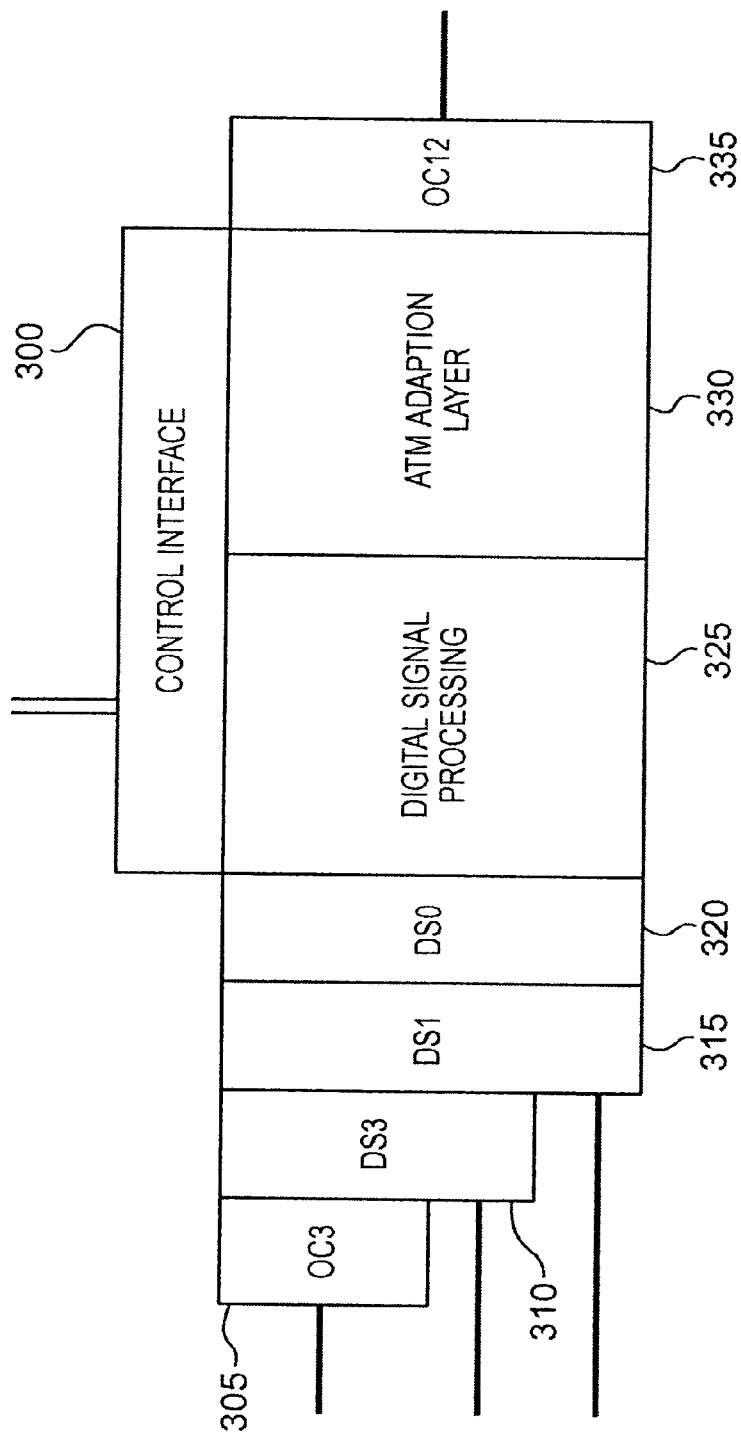
FIG. 3 is a block diagram of a version of the present invention.

FIG. 3 shows one embodiment of the mux that is suitable for the present invention, but muxes that support the requirements of the invention are also applicable. Shown are control interface 300, OC-3 interface 305, DS3 interface 310, DS1 interface 315, DS0 interface 320, digital signal processing (DSP) 325, AAL 330, and OC-12 interface 335.

OC-3 interface 305 accepts the OC-3 format and makes the conversion to DS3. DS3 interface 310 accepts the DS3 format and makes the conversion to DS1. DS3 interface 310 can accept DS3s from OC-3 interface 305 or from an external connection. DS1 interface 315 accepts the DS1 format and makes the conversion to DS0. DS1 interface 315 can accept DS1s from DS3 interface 310 or from an external connection. DS0 interface 320 accepts the DS0 format and provides an interface to digital signal processing (DSP) 325.

DS0 interface 320 is coupled to DSP 325. DSP 325 is capable of manipulating the user information to improve transmission quality. DSP processing primarily entails echo cancellation, but could include other features as well. As is known, echo cancellation can be required for voice calls. DSP 325 passes the DS0s through echo cancellers. These echo cancellers must be disabled for calls that do not require echo control. Data calls do not require echo cancellation, and the CCM has the ability to recognize data calls that require an echo canceller to be disabled. The CCM will send a control message through control interface 300 to DSP 325 indicating the particular echo canceller that is to be disabled. The CCM selects the echo canceller based on the CIC in the signaling it receives from the user. After the data call, the CCM sends a message that causes the particular echo canceller to be enabled again for subsequent voice calls. The above technique of applying echo control is preferred, but other means of implementing echo control instructions from the CCM are also applicable.

In addition to echo control, the CCM and the mux can work to provide other digital signal processing features on a call by call basis. Compression algorithms can be applied, either universally, or on a per call basis. The decibel level could be adjusted for calls form a particular origin or to a particular destination, i.e. where a hearing impaired person may reside. Encryption could be applied on a call-by-call basis based on various criteria like the origination number or the destination number. Various DSP features could be associated with various call perameters and implemented by the CCM through DSP 325.

DSP 325 is connected to AAL 330. AAL 330 operates as described above for an AAL. DS0—virtual connection assignments from control interface 300 are implemented by AAL 330 when converting between the DS0 and ATM formats.

Calls with a bit rate greater than 64 kbit/sec. are known as N×64 calls. If desired, AAL 330 can be capable of accepting control messages through control interface 300 from the CCM for N×64 calls. The CCM would instruct AAL 330 to group the DS0s for the call.

The ATM Cross-connect System

Figure 4:
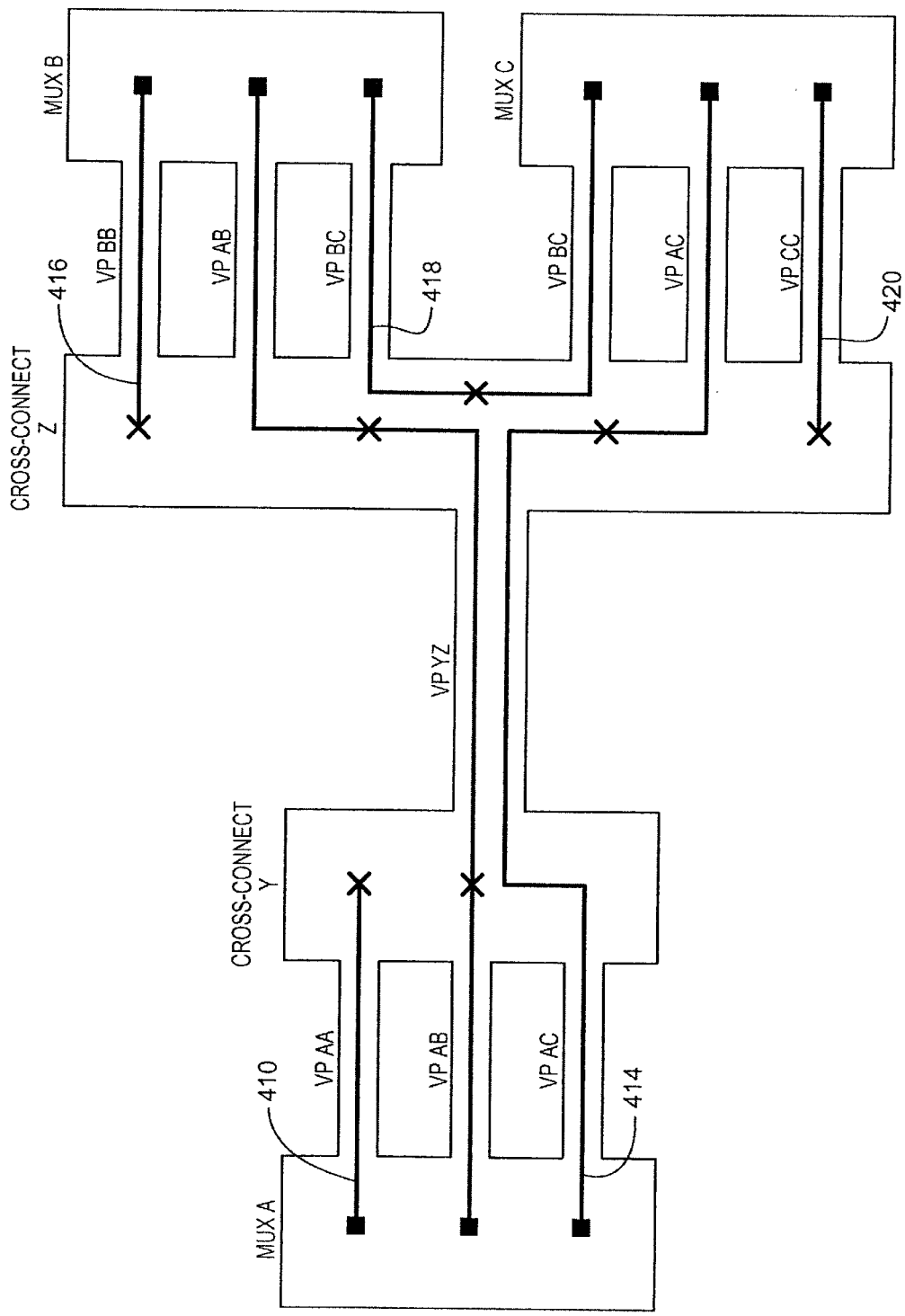
FIG. 4 is a block diagram of a version of the present invention.

FIG. 4 depicts virtual connections provided by the ATM cross connect system in a version of the invention, although numerous other techniques for providing virtual connections will be appreciated by one skilled in the art, and the invention contemplates any such system. Shown are virtual connections 410, 412, 414, 416, 418, and 420. These virtual connections are shown interconnecting muxes A, B, and C through cross-connects Y and Z. Virtual connections are provisioned in between each mux. Each mux would have a virtual path to the cross-connect system that is designated for each possible destination mux. Virtual path AB contains virtual connection 412 from mux A to mux B. For calls that originate and terminate at the same mux, virtual connections 410, 416, and 420 are provisioned for that purpose. Virtual connections 414 and 418 connect muxes A/C and B/C respectively. Alternate routes for different virtual connections can be provisioned between the same two muxes.

Within each virtual path are thousands of virtual channels (not shown). Virtual connections are provisioned by cross-connecting VPI/VCI combinations at cross-connects Y and Z. If a call enters mux A and needs to terminate at mux B, the CCM will select virtual path AB. The selection could be based on a translation of the dialed number. Within virtual path AB, the CCM would select the particular virtual channel. This selection could be based on available VCIs within the VPI. In this way, pre-provisioned virtual connections can be selected on a call by call basis.

Typically, calls will require a bi-directional voice connection. For t his purpose, a virtual connection must transport user information in both directions. The virtual connections can be provisioned so that the mux at the terminating end may use the same VPI/VCI for cells transported in the opposite direction. The terminating CCM could also translate the originating VPI/VCI into another VPI/VCI provisioned in the opposite direction and provide this VPI/VCI to the terminating mux.

Additionally, the number of active virtual connections in between cross-connects can be tracked. Virtual path YZ connects cross-connects Y and Z. The capacity of virtual path YZ would be sized based on network requirements, but should it become overloaded, the CCMs can be programmed to select an alternate virtual path.

Operation within a Network

Figure 5:
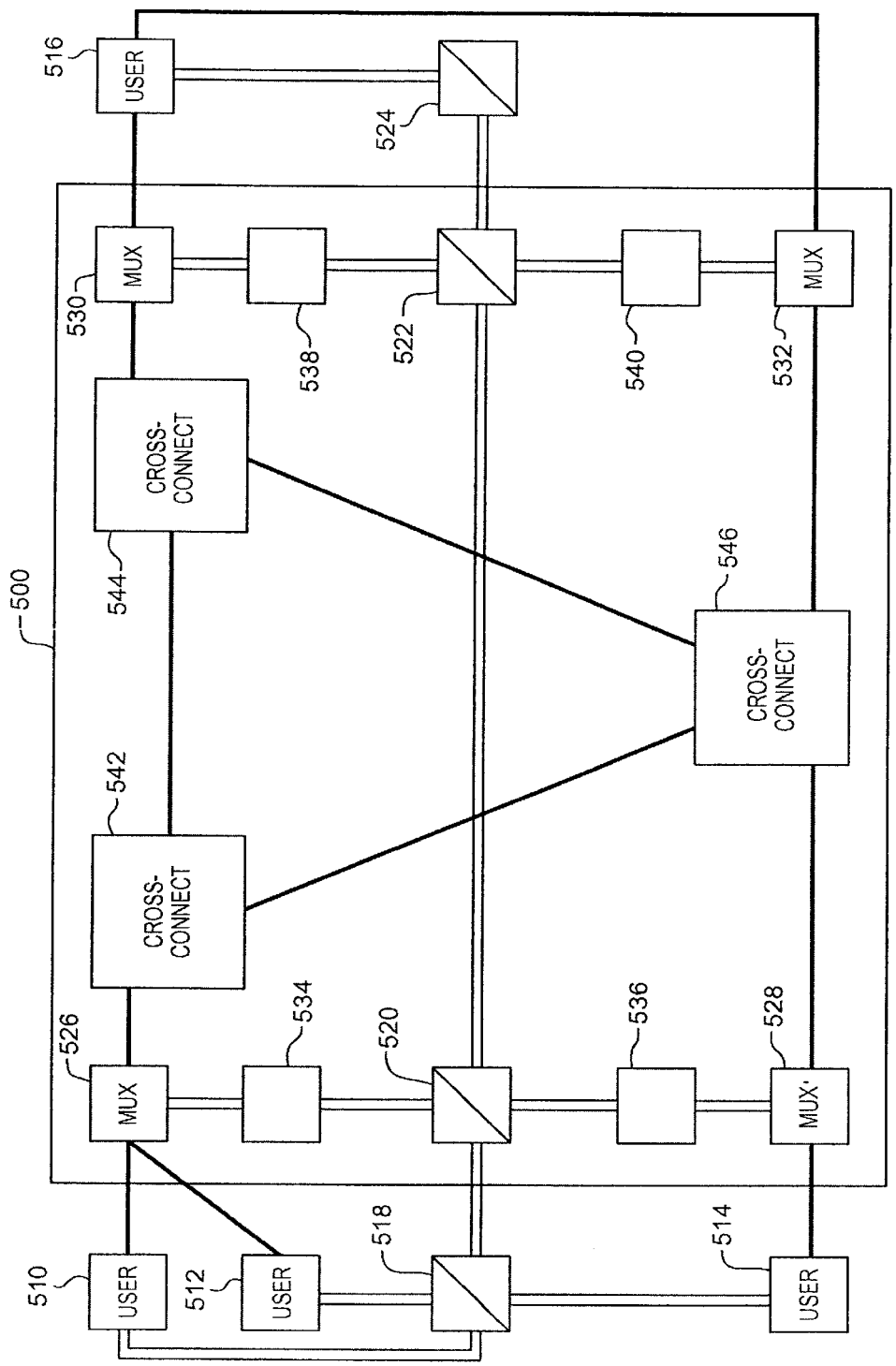
FIG. 5 is a block diagram of a version of the present invention.

FIG. 5 depicts an embodiment of the invention with respect to a specific telecommunications network scenario, although the invention is not limited to this specific scenario. FIG. 5 shows telecommunications system 500. Shown are user 510, user 512, user 514, user 516, STP 518, STP 520, STP 522, STP 524, mux 526, mux 528, mux 530, mux 532, call/connection manager (CCM) 534, CCM 536, CCM 538, CCM 540, ATM cross-connect 542, ATM cross-connect 544, and ATM cross-connect 546. For clarity, the connections and signaling links are not numbered. All of these components are described, and the CCMs are also discussed below.

In operation, user 510 may forward an 800 call to system 500. User 510 could be connected to mux 526 with a DS3 connection. The 800 call would occupy a DS0 embedded in the DS3 connected to mux 526. User 510 would send an SS7 Initial Address Message (IAM) through STP 518 to system 500. STP 520 would be configured to route the IAM to CCM 534. An IAM contains information such as the dialed number, the caller's number, and the circuit identification code (CIC). The CIC identifies the DS0 used by user 510 for the call.

CCM 534 would process the IAM and identify that the call was an 800 call. Either through its own database or by accessing a service control point (SCP) (not shown), the CCM would translate the dialed number based on the 800 subscriber's routing plan. For example, 800 calls from user 510 may be routed to user 512 during business hours, to user 514 at night, and to user 516 on weekends. If the call is placed from user 512 on a weekend, the call would be routed to user 516. As such, CCM 534 would select a pre-provisioned virtual connection from mux 526 through ATM cross-connect 542 and ATM cross-connect 544 to mux 530. CCM 534 would send an IAM message to CCM 538 through STP 520 and STP 522. The IAM would indicate that a call was being routed to user 516 and would identify the selected virtual connection being used to reach mux 530.

Typically, mux 530 would be connected to user 516 with a DS3 connection. CCM 538 would select a DS0 embedded in the DS3 and would send an IAM to user 516 through STP 522 and STP 524. The CIC of the IAM would indicate that a call was being routed to user 516 over the selected DS0. User 516 would process the IAM and complete the call. When the call is answered, user 516 would transmit an answer message (ANM) through STP 524 back to system 500.

CCM 534 would also send a UDP/IP message to mux 526 instructing it to assemble the user information in the DS0 from user 510 into ATM cells with a cell header identifying the selected virtual connection. CCM 538 would send a UDP/IP message to mux 530 instructing it to dis-assemble ATM cells from the selected virtual connection and output the user information to the selected DS0 to user 516. ATM cross-connect 542 would route ATM cells from mux 526 to ATM cross-connect 544 based on the cell header. Likewise, ATM cross-connect 544 would route these cells to mux 530 based on the cell header. As such, user information for the call would flow from user 510 to user 516 over the DS0 from user 510, the virtual connection selected by CCM 534, and the DS0 to user 516 selected by CCM 538. The muxes would implement the selections of the CCMs.

The call would require that a voice channel be available in both directions. As such, the DS0s and virtual connection would be bi-directional. Cut-through on the receive channel (from the user 516 to the user 510) would occur after the address complete message (ACM) had been received by system 500. Cut-through on the transmit channel (from the user 510 to the user 516) would occur after the answer message (ANM) had been received by system 500. This could be accomplished by not allowing mux 530 to release any cells for the call until the ANM has been received by system 500.

If user 510 were to place the call at night, CCM 534 would determine that user 514 was the destination. Accordingly a pre-provisioned virtual connection from mux 526 through ATM cross-connect 542 and ATM cross-connect 546 to mux 528 would be selected for the call. CCM 536 would select the DS0 to user 514.

If user 510 were to place the call during the day, CCM 534 would determine that user 512 was the destination. Accordingly a pre-provisioned virtual connection from mux 526 through ATM cross-connect 542 and back to mux 526 would be selected for the call. CCM 534 would also select the DS0 to user 512.

The Call/Connection Manager (CCM)

Figure 6:
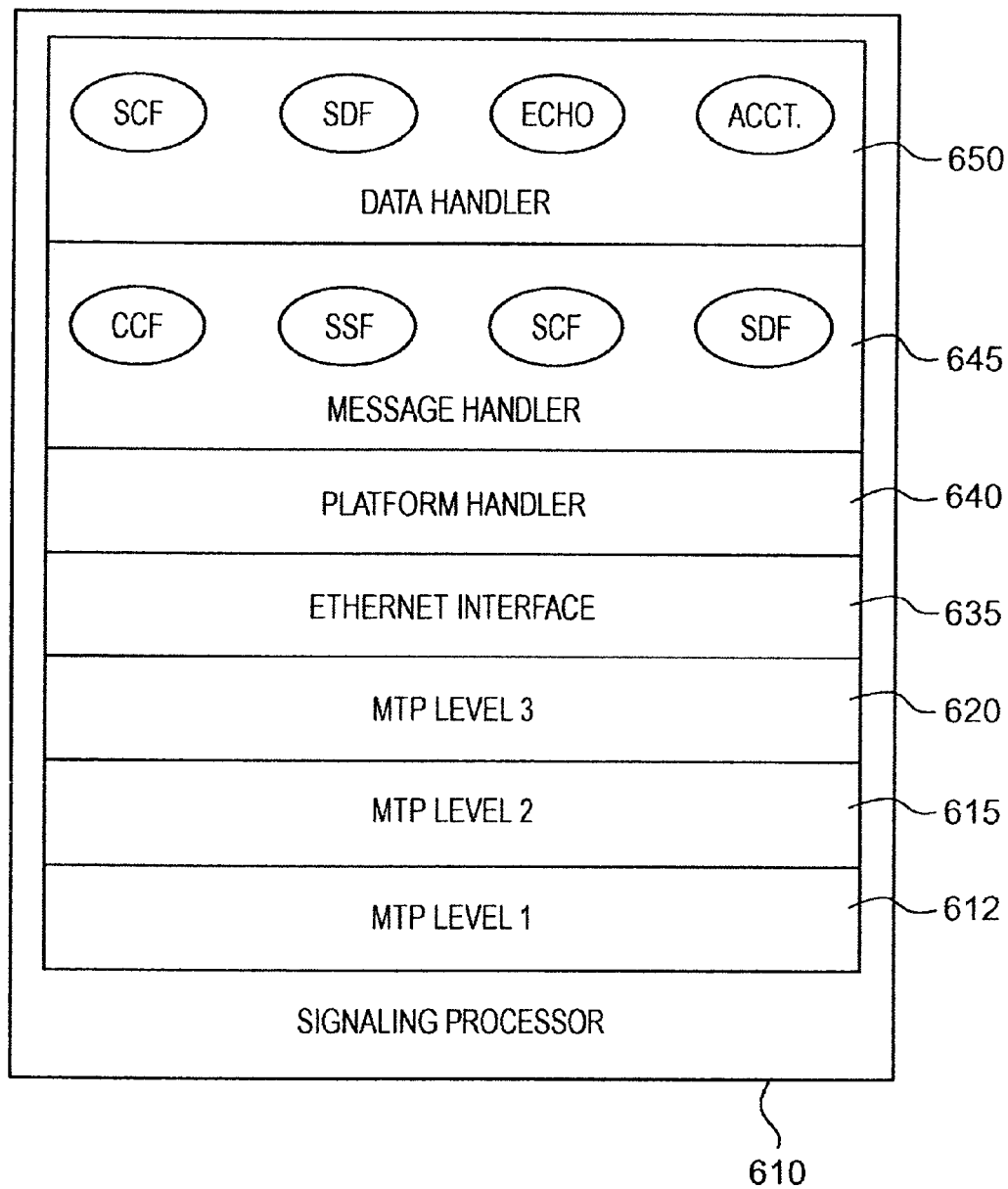
FIG. 6 depicts a logic diagram of a version of the invention.

FIGS. 6–12 refer to a preferred embodiment of the signaling processor, also known as the CCM, but any processor which supports the requirements stated for the invention would suffice. FIG. 6 depicts a signaling processor suitable for the invention. Signaling processor 610 would typically be separate from the mux, but those skilled in the art appreciate that they could be housed together. Also, signaling processor may support a single mux or support multiple muxes.

Signaling processor 610 includes Message Transfer Part (MTP) level 1 612, MTP level 2 615, and MTP level 3 620.

MTP level 1 612 defines the physical and electrical requirements for a signaling link. MTP level 2 615 sits on top of level 1 and maintains reliable transport over a signaling link by monitoring status and performing error checks. Together, MTP levels 1–2 provide reliable transport over an individual link. A device would need MTP level 1–2 functionality for each link it uses. MTP level 3 620 sits on top of level 2 and provides a routing and management function for the signaling system at large. MTP level 3 620 directs messages to the proper signaling link (actually to the MTP level 2 for that link). MTP level 3 620 directs messages to applications using the MTP levels for access the signaling system. MTP level 3 620 also has a management function which monitors the status of the signaling system and can take appropriate measures to restore service through the system. MTP levels 1–3 correspond to layers 1–3 of the open systems interconnection basic reference model (OSIBRF). Both the MTP 1–3 and the OSIBRF are well known in the art Also shown for signaling processor 610 are ethernet interface 635, platform handler 640, message handler 645, and data handler 650. Ethernet interface 635 is a standard ethernet bus supporting TCP/IP which transfers signaling messages from MTP level 3 to platform handler 640. Also, if UDP/IP is used to communicate with the muxes, ethernet interface 335 would accept the links to the muxes. Those skilled in the art will recognize other interfaces and protocols which could support these functions in accord with the invention.

In accord with this invention, the logic of the signaling interface (indicated by reference numerals 612, 615, 620, and 635) would be operational to route select ISUP messages to platform handler 640. Technique for doing this have been discussed above. Preferably, an SS7 interface to platform handler 640 could be constructed using commercially available SS7 software interface tools. An example of such tools would be SS7 interface software provided by Trillium, Inc.

Platform handler 640 is a system which accepts ISUP and B-ISUP messages from ethernet interface 635 and routes them to message handler 645. Preferably, platform handler 640 is configured to route messages to a particular message handler processor based on the signaling link selection (SLS) code in the message. Message handler 645 is a system which exchanges signaling with platform handler 640 and controls the connection and switching requirements for the calls. It can select and implement services and initiate echo control. It also converts signaling between ISUP and B-ISUP. Data handler 650 is a set of logic coupled to message handler 645 which processes service requests and provides data to message handler 645. Data handler 650 also controls echo cancellers and generates billing records for the call.

In the discussions that follow, the term ISUP will include B-ISUP as well. In operation, ISUP messages that meet the proper criteria are routed by MTP and/or ATM interface 615, MTP level 3 620, and ethernet interface 635 to platform handler 640. Platform handler 640 would route the ISUP messages to message handler 645. Message handler 645 would process the ISUP information. This might include validation, screening, and determining if additional data is needed for call processing. If so, data handler 650 would be invoked and would provide message handler 645 with the relevant data so message handler 645 could complete call processing. Message handler 645 would generate the appropriate ISUP message to implement the call and pass the signals to platform handler 640 for subsequent transmission to the designated network elements.

The distribution of functional entities among message handler 645 and data handler 650 are shown. These functional entities are well known in the art. Message handler 645 includes at least the call control function (CCF) and the service switching function (SSF). The CCF establishes and releases call connections, and the SSF recognizes triggers during call processing by the CCF and provides an interface between the CCF and the service control function (SCF). The SCF identifies services and obtains data for the service. In some embodiments, message handler 645 can include the SCF and the service data function (SDF). The SDF provides service data in real time to the SCF. Taken together, message handler 645 is able to at least control connections and recognize triggers. In some embodiments, message handler 645 can also identify services, obtain data for the services, and generate the signaling required to implement the services. Message handler 645 can provide signaling interworking (i.e. ISUP to B-ISUP), connection control, service selection and service implementation in a logically integrated package that interfaces with the network through conventional means.

Data handler 650 includes at least the SCF and the SDF. In some embodiments, message handler 645 and data handler 650 both include the SCF and the SDF and services are partitioned among the functional entities. Two other functions are shown in data handler that are not standardized functional entities. Accounting generates a billing record and echo handles the echo cancellers. Typically, an echo canceller is disabled for a data call and enabled after the data call for use on subsequent voice calls, however, other techniques are applicable.

In operation, the CCF would perform basic call processing until the SSF recognized a trigger and invoked the SCF. The SCF would identify the service associated with the trigger. The SCF would access data from the SDF in order to implement the service. The SCF would process the data from the SDF and provide the data to the CCF through the SSF. The CCF would then set-up the connections through conventional signaling to service switching points (SSPs). The SSPs are connected to the communications path and make the connections. Typically, an SSP is a switch. Also, echo cancellers may be controlled for the call, and a billing record could be generated for the call.

Those skilled in the art are aware of various hardware components which can support the requirements of the invention. For example, the platform handler, message handler, and data handler could each reside on a separate SPARC station 20.

The Platform Handler

Figure 7:
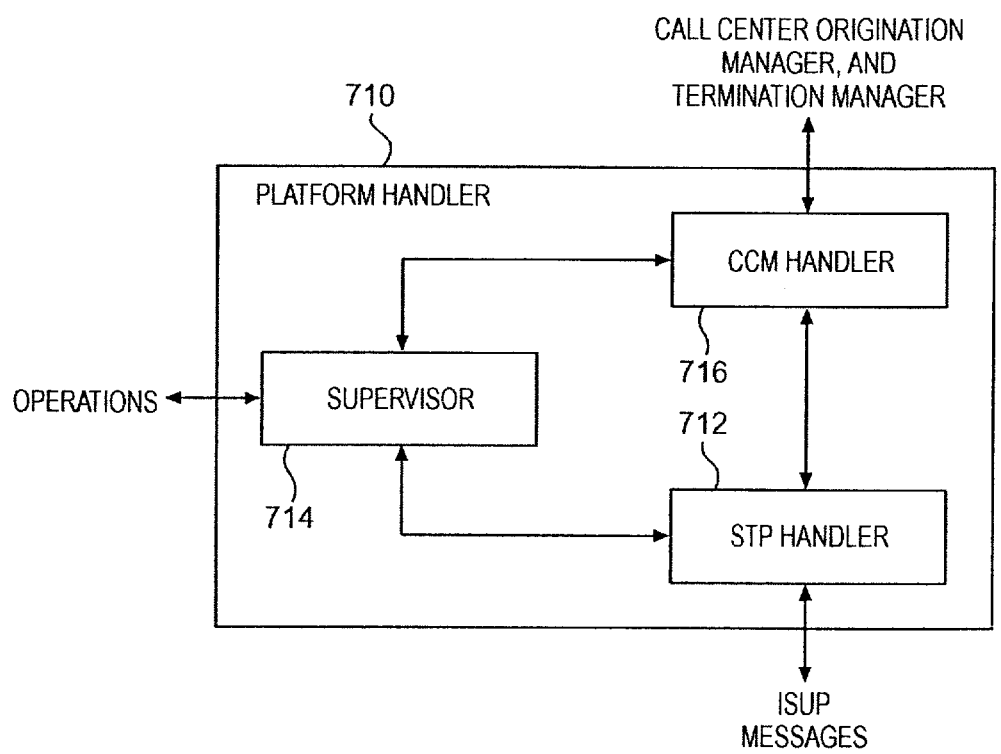
FIG. 7 depicts a logic diagram of a version of the invention.

FIG. 7 shows a possible version of the platform handler. Platform handler 710 is shown. Platform handler 710 includes STP handler 712, supervisor 714, and CCM handler 716. Platform handler 710 transmits and receives ISUP messages to/from the signaling interface (reference numerals 312, 315, 320, and 335). STP handler 712 would provide the ethernet—TCP/IP interface. STP handler 712 has a process to buffer and dis-assemble the incoming packets to the CCM, and buffer and assemble outgoing packets. STP handler 712 could also check the messages for basic flaws. Any technique for transfer of signaling messages to platform handler 710 is contemplated by the invention.

Supervisor 714 is responsible for managing and monitoring CCM activities. Among these are CCM start-up and shut-down, log-in and log-off of various CCM modules, handling administrative messages (i.e. error, warning, status, etc.) from the CCM modules, and handling messages from network operations such as queries, configuration instructions, and data updates. The connection to network operations is the man machine interface which allows the CCM to be controlled and monitored by either a remote or a local operator. Supervisor 714 has a process which retrieves configuration data from internal tables to initialize and configure the CCM. The CCM modules also have internal tables which are used in conjunction with this procedure. Supervisor 714 also communicates internally with STP handler 712 and CCM handler 716.

CCM handler 716 exchanges ISUP information with STP handler 712. CCM handler 716 also exchanges ISUP messages and CCM supervisory messages with the message handler. The connection between CCM handler 716 and the message handler could be an ethernet LAN transporting these messages encapsulated in TCP/IP packets, but other methods are known. CCM handler 716 would provide the ethernet—TCP/IP interface. CCM handler 716 has a process to buffer and dis-assemble the incoming packets from the message handler, and buffer and assemble outgoing packets to the message handler. CCM handler 716 could also check the messages for basic flaws.

Internally, platform handler 710 is equipped with bi-directional channels which exchange information among STP handler 712, supervisor 714, and CCM handier 716. The channels between STP handler 712, CCM handler 715, and supervisor 712 carry supervisory and administrative information. The channel between STP handler 712 and CCM handler 716 carries ISUP message information.

Platform handler 710 accepts, disassembles, and buffers ISUP messages received from the network. It can perform basic checks on the messages before transferring them to the message handler. Should more than one message handler be connected to platform handler 710, the ISUP messages could be allocated to the message handlers based on the SLS of the particular ISUP message. CCM handler 716 accepts routing instructions from the message handler for routing certain ISUP messages to select processes of the message handler. Platform handler 710 also provides supervision and a man/machine interface for the CCM.

The Message Handler.

Figure 8:
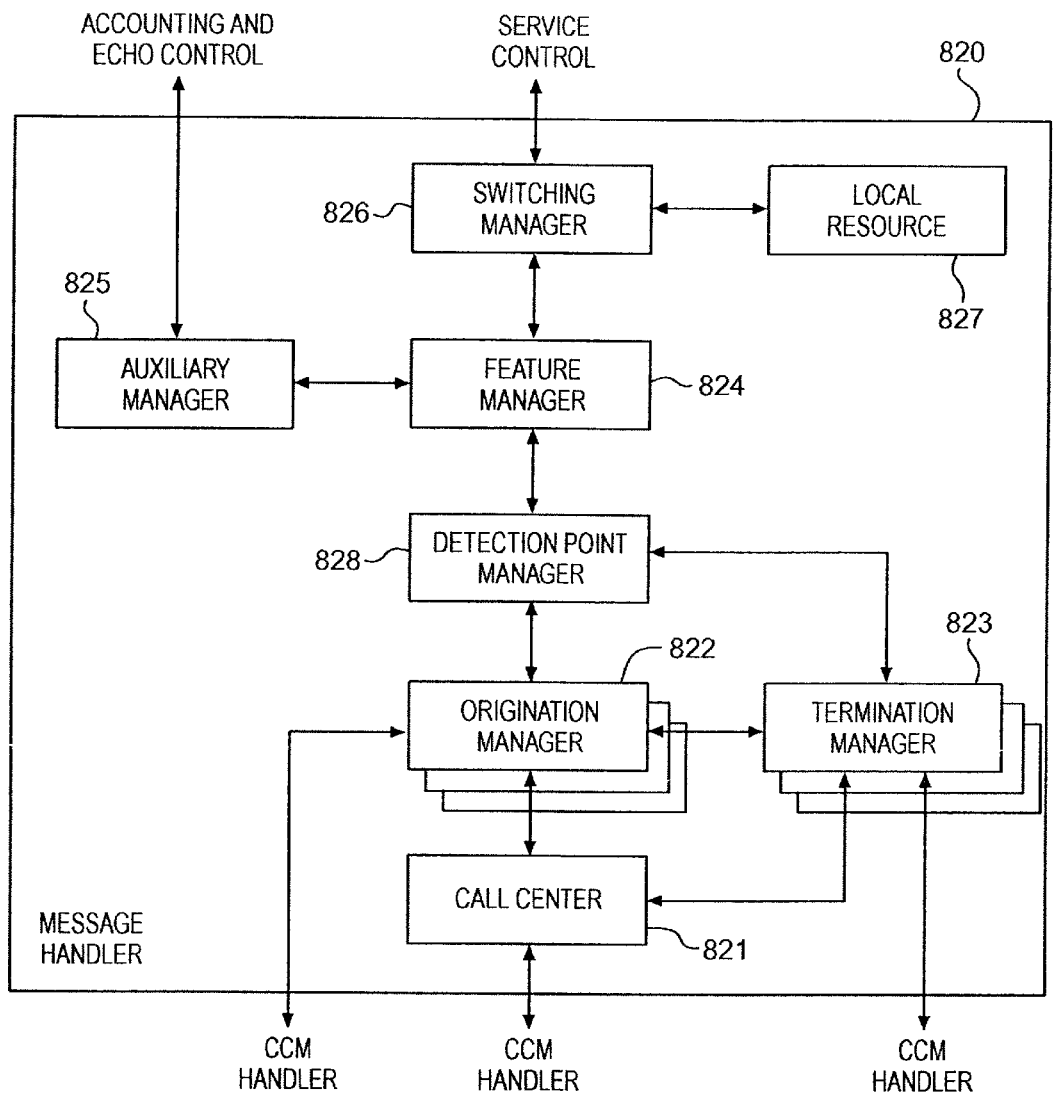
FIG. 8 depicts a logic diagram of a version of the invention.

FIG. 8 depicts a version of the message handler. Message handler 820 is shown and includes call center 821, origination manager 822, termination manager 823, detection point manager 828, feature manager 824, auxiliary manager 825, switching manager 826, and local resource 827. A primary function of message handler 820 is to process ISUP messages.

Call center 821 is the process which receives call set-up messages from the platform handler. ISUP call set-up is initiated with the IAM. When call center 821 receives an IAM, it creates an instance of an origination manager process with data defined by the information in the IAM. Origination manager 822 represents any of the origination manager processes spawned by call center 821. The CCM handler is instructed of the new instance so that subsequent ISUP messages related to that call can be transferred directly to the appropriate instance of origination manager 822 by the platform handler.

Origination manager 822 sets up a memory block called an originating call control block. The call control block provides a repository for information specific to a call. For example, the originating call control block could identify the following: the call control block, the origination manager, the message handler, the originating LEC, the LEC trunk circuit (CIC), the ATM virtual circuit, the ATM virtual path, the caller's number, the dialed number, the translated dialed number, the originating line information, the ANI service class, the selected route, the number of the selected route, the SLS, the OPC, the DPC, the service indicator (SiO), echo cancellation status, reason of release, call status, and pointers to adjacent call control blocks. In addition, the call control block would also contain the various times that signaling messages are received, such the address complete message (ACM), the answer message (ANM), the suspend message (SUS), the resume message (RES), and the release message (REL). Those skilled in the art would be aware of other pertinent data to include.

Origination manager 822 executes call processing in accordance with the Basic Call State Model (BCSM) recommended by the International Telecommunications Union (ITU), but with some notable exceptions. Origination manager 822 processes the IAM through each point in call (PIC) until a detection point (DP) is encountered. When a detection point is encountered, a message is sent to detection point manager 828 and processing is suspended at origination manager 822 until detection point manager 828 responds. An example of a detection point for origination manager 822 would be to authorize an origination attempt.

Detection point manager 828 accepts messages from originating manager 822 caused by a detection point encountered during call processing. Detection point manager 828 will identify whether or not the detection point is armed. An armed detection point has specific criteria which can affect call processing if met. If the detection point is not armed, detection point manager 828 will send a continue signal back to origination manager 822. A continue message instructs origination manager 822 to continue call processing to the next detection point. If the detection point is armed, detection point manager 828 will take action to see if the detection point criteria are met. If detection point manager 828 requires assistance to process the armed detection point, it will send a message to feature manager 824.

Feature manager 824 would accept messages from detection point manager 828 and either forward the a message to auxiliary manager 825 or to switching manager 826. Particular feature messages would be routed to auxiliary manager 825 which will process these call features. These are typically non-IN features, such as echo control or POTS billing. Other feature messages would be routed to switching manager 826. These are typically IN features. Examples of IN features are 800 number translation or a terminal mobility number translation. Feature manager 824 will pass information back to detection point manager 828 (then to origination manager 822) when it is received back from auxiliary manager 825 or switching manager 826.

Switching manager 826 which will determine if the request will be handled by local resource 827 or by the data handler. Local resource 827 will be structured to provide data more efficiently stored at message handler 820. Examples of such data include: an automatic number identification (ANI) validation table which checks the caller's number, a dialed number translation table to translate POTS numbers into a routing instructions, or N00 translation tables to translate select 800 numbers into routing instructions. Examples of a routing instruction yielded by the tables would be a particular access connection or a virtual connection. An example of data in the data handler would be virtual private network (VPN) routing tables or complex 800 routing plans.

Typically, originating manager 822 will execute through the pertinent points in call to a point indicating that set up is authorized. At this point, origination manager 822 will instruct call center 821 to create an instance of a termination manager. Termination manager 823 represents any of these termination managers. Origination manager 822 will also transfer IAM information to termination manager 823. Termination manager 823 sets up a memory block called a terminating call control block. The call control block provides a repository for information specific to a call and is similar in composition to the originating call control block.

Termination manager 823 also operates in accord with the BCSM of the ITU, but also with some exceptions. Termination manager 823 continues processing for the call through its own points in call until detection points are encountered. When a detection point is encountered, a message is sent to detection point manager 828 and processing is suspended at termination manager 823 until detection point manager 828 responds. An example of detection point for termination manager 822 would be to authorize termination which would entail authorizing the call as set-up by origination manager 822. Messages from termination manager 823 to detection point manager 828 are handled as discussed above for messages from originating manager 822. When processing by termination manager 823 is complete, it will produce a signaling message to transmit through platform handler 410 to the appropriate multiplexers, and possibly to the users.

Message handler 820 communicates with the data handler using a data transfer protocol. Examples include UDP/IP, or the Intelligent Network Applications Protocol (INAP) which is contained within the component sublayer of Transaction Capabilities Application Part (TCAP).

The Data Handler

Figure 9:
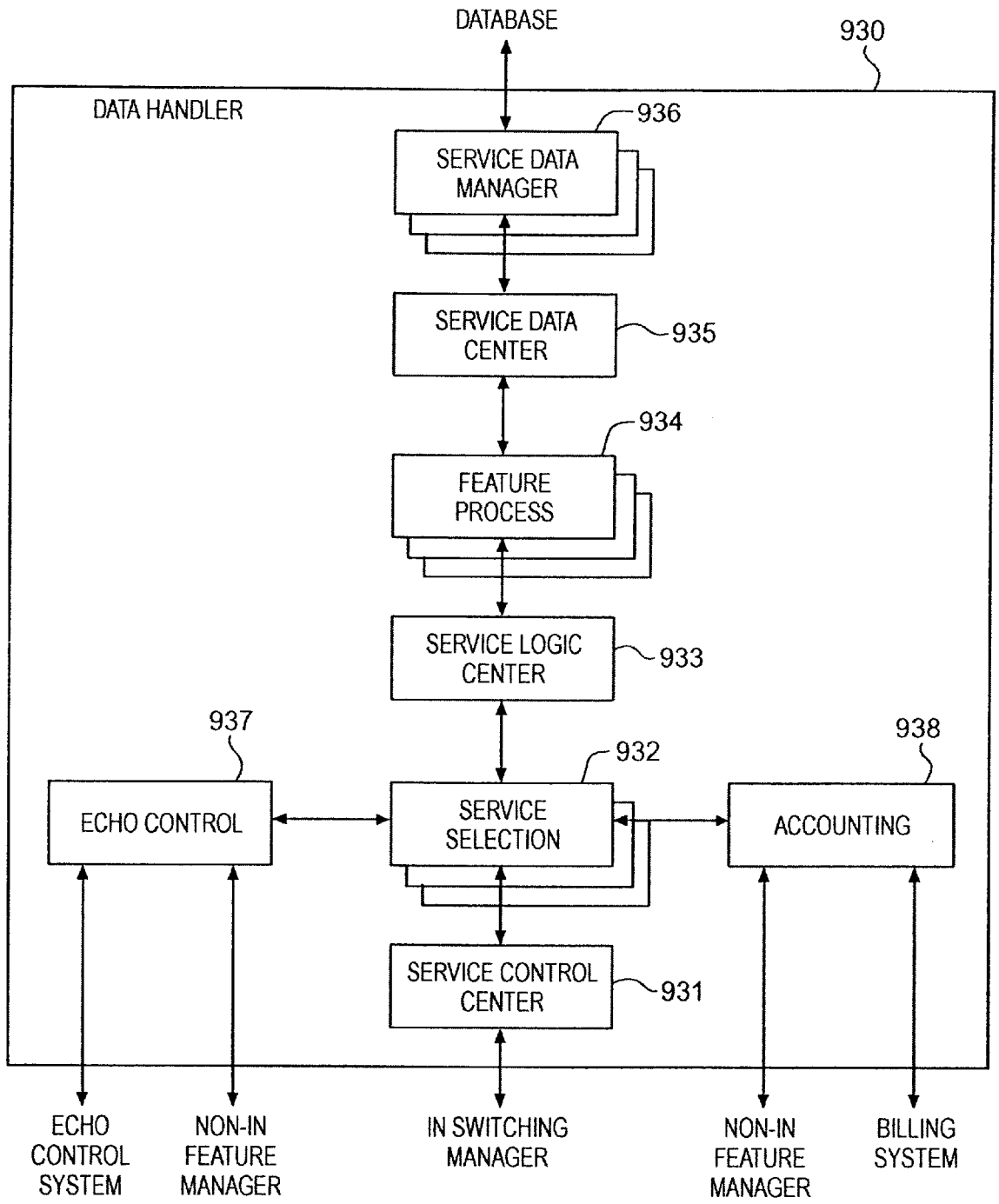
FIG. 9 depicts a logic diagram of a version of the invention.

FIG. 9 shows a version of the data handler. Data handler 930 is shown. Data handler 930 includes service control center 931, service selection 932, service logic center 933, feature process 934, service data center 935, service data manager 936, echo control 937, and accounting 938. Data handler 930 receives service request messages from the message handler. These messages result from an armed detection points triggering the message handler to invoke data handler 930. The messages also result from features implemented through the auxiliary manager. Service control center 931, service logic center 933, and service data center 935 are static processes created at start-up. Service control center 931 creates instances of service selection managers on a call by call basis. Service control center 931 notifies the Switching manager to route subsequent service request messages for that call to the appropriate service selection manager. Service selection manager 932 represents any of the service selection managers created by service control center 931.

Service selection manager 932 executes the service portion of the call processing. Service selection manager 932 identifies the various services associated with each message and implements the service through messages to service logic center 933. Service logic center 933 accepts messages from service selection 932 and creates instances of the feature processes required for the identified services. Examples of feature processes are N00, messaging, personal/terminal mobility, and virtual private network (VPN). Feature processes are service logic programs which implement the required services for a call. Feature process 934 represents any of the feature processes created by service logic center 933. Feature process 934 accesses the network resources and data required to implement the service. This would entail executing service independent blocks (SIBs). A SIB is a set of functions. An example of a function would be to retrieve the called number from a signaling message. SIBs are combined to build a service. An example of a SIB is translating a called number.

Those skilled in the art are familiar with the above services, although they have never been implemented by a system such as the present invention. N00 services are services such as 800, 900, or 500 calling in which the dialed number is used to access call processing and billing logic defined by the subscriber to the service. Messaging entails connecting the caller to a voice massaging se r vice. For example, the receipt of a release message (REL) with a cause of busy could be a trigger recognized by the message handler. In response, the data handler would create an instance of the messaging feature process and determined if a call placed to a particular dialed number would require the voice messaging platform. If so, the CCM would instruct an SSP to connect the caller to the voice message platform. Personal/Terminal mobility includes recognizing that the dialed number has mobility that requires a database look-up to determine the current number. The database is updated when the called party changes locations. VPN is a private dialing plan. It is used for calls from particular dedicated lines, from particular calling numbers (ANIs), or to particular dialed numbers. Calls are routed as defined for the particular plan.

In the execution of the SIB to provide the service, feature process 934 would invoke service data center 935 to create an instance of service data manager 936. Service data manager 936 accesses the network databases that provide the data required for the service. Access could be facilitated by TCAP messaging to an SCP. Service data manager 936 represents any of the service managers created by service data center 935. Once the data is retrieved, it is transferred back down to feature process 934 for further service implementation. When the feature processes for a call finish execution, service information is passed back down to the message handler and ultimately to the origination or termination manager for the call.

After a release message on a call, billing requests will be forwarded to accounting 938. Accounting 938 will use the call control block to create a billing record. The call control block would contain information from the ISUP messages for the call and from CCM processing. From the address complete message (ACM), the call control block would include the routing label, CIC, message type, and cause indicators. From the answer message (ANM), the call control block would include the routing label, CIC, message type, and backward call indicators. From the initial address message (IAM), the call control block would include the routing label, CIC, message type, forward call indicators, user service information, called party number, calling party number, carrier identification, carrier selection information, charge number, generic address, origination line information, original called number, and redirecting number. From the release message (REL), the call control block would include the routing label, CIC, message type, and cause indicators. From the suspend message (SUS) or the pass along message (PAM), the call control block would include the routing label, CIC, and message type. Those skilled in the art are familiar with other pertinent information for a billing record and appreciate that some of this information could be deleted.

For POTS calls, the billing request will come from the origination and termination managers through the auxiliary manager. For IN calls, the request will come from service selection 932. Accounting 938 will generate a billing record from the call control blocks. The billing record will be forwarded to a billing system over a billing interface. An example of such an interface is the I.E.E.E. 802.3 FTAM protocol.

At some point during call set-up, the origination manager, termination manager or even the detection point process will check the user service information data and originating line information to assess the need for echo control. If the call is a data call, a message is sent to data handler 930. Specifically, the message is routed through the auxiliary manager to the echo control manager 937 in data handler 930. Based on the CIC, echo control manager 937 can select which echo canceller and DS0 circuit needs to be disabled. A message will be generated to that effect and transmitted over a standard data link to the pertinent echo canceller or echo control system. As described above, echo control can be implemented by the multiplexer. Once a release (REL) message is received for the call, the echo canceller is re-enabled. On a typical call, this procedure will occur twice. Once for an echo canceller on the access side, and again for an echo canceller on the terminating side. The CCM that handles the IAM for a particular call segment will control the particular echo cancellers for the segment.

IAM Call Processing

Prior to a description of IAM processing, a brief description of SS7 message is given. SS7 messaging is well known in the art. SS7 ISUP messages contain numerous fields of information. Each message will have a routing label containing a destination point code (DPC), an origination point code (OPC), and a signaling link selection (SLS) which are used primarily for routing the message. Each message contains a circuit identification code (CIC) which identifies the circuit to which the message relates. Each message contains the message type which is used to recognize the message. ISUP messages also contain mandatory parts filled with fixed length data and variable length data, in addition to a part available for optional data. These parts vary from message type to message type depending on the information needed.

The initial address message (IAM) initiates the call and contains call set-up information, such as the dialed number. IAMs are transferred in the calling direction to set up the call. During this process, TCAP messages may be sent to access remote data and processing. When the IAMs have reached the final network element, an address complete message (ACM) is sent in the backward direction to indicate that the required information is available and the called party can be alerted. If the called party answers, an answer message (ANM) is sent in the backward direction indicating that the call/connection will be used. If the calling party hangs up, a release message (REL) is sent to indicate the connection is not being used and can be torn down. If the called party hangs up, a suspend message (SUS) is sent and if the called party reconnects, a resume (RES) message keeps the line open, but if their is no re-connection, a release message (REL) is sent. When the connections are free, release complete messages (RLC) are sent to indicate that the connection can be re-used for another call. Those skilled in the art are aware of other ISUP messages, however, these are the primary ones to be considered. As can be seen, the IAM is the message that sets-up the call.

Figure 10:
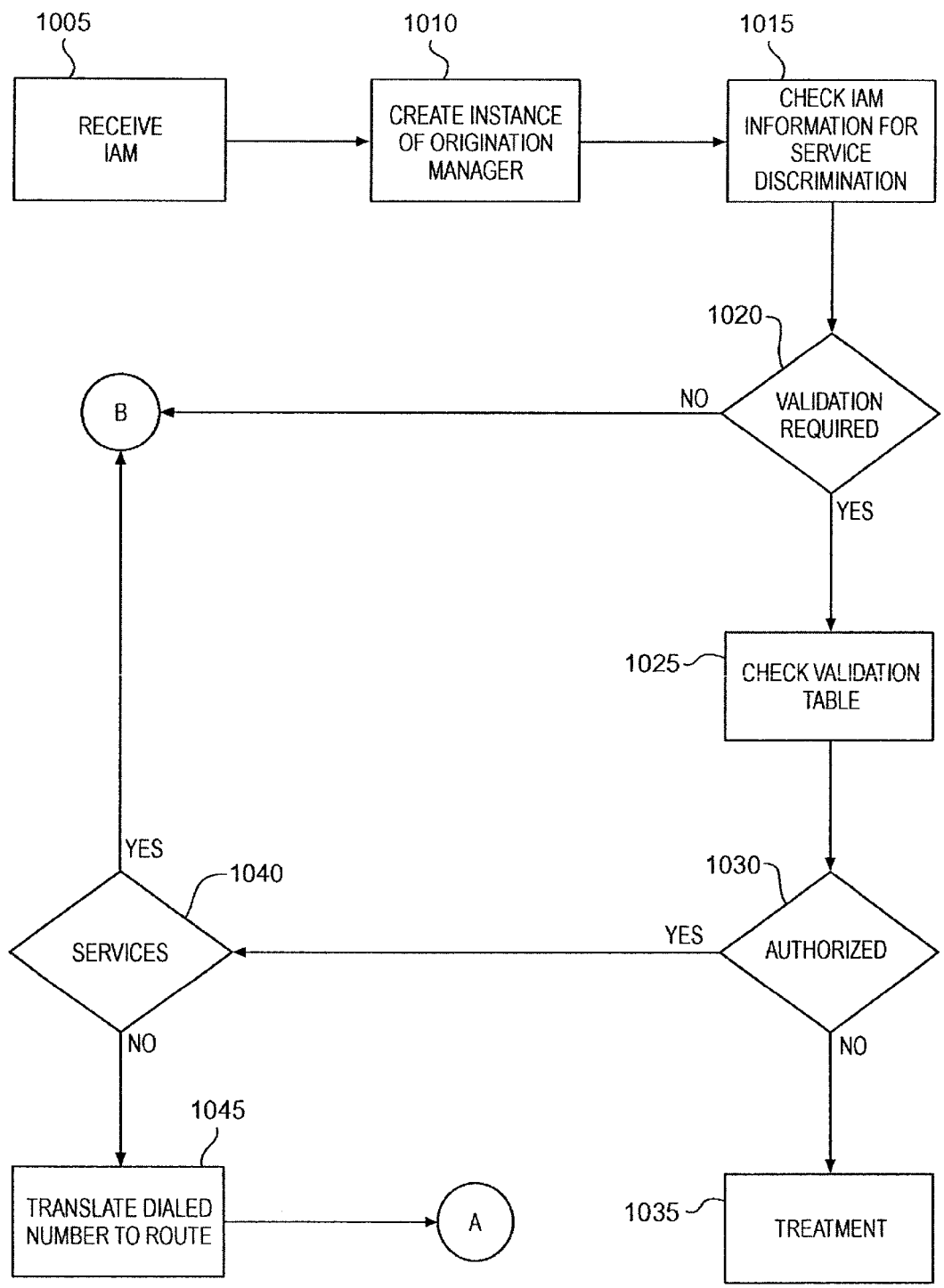
FIG. 10 depicts a flow diagram of a version of the invention.
Figure 11:
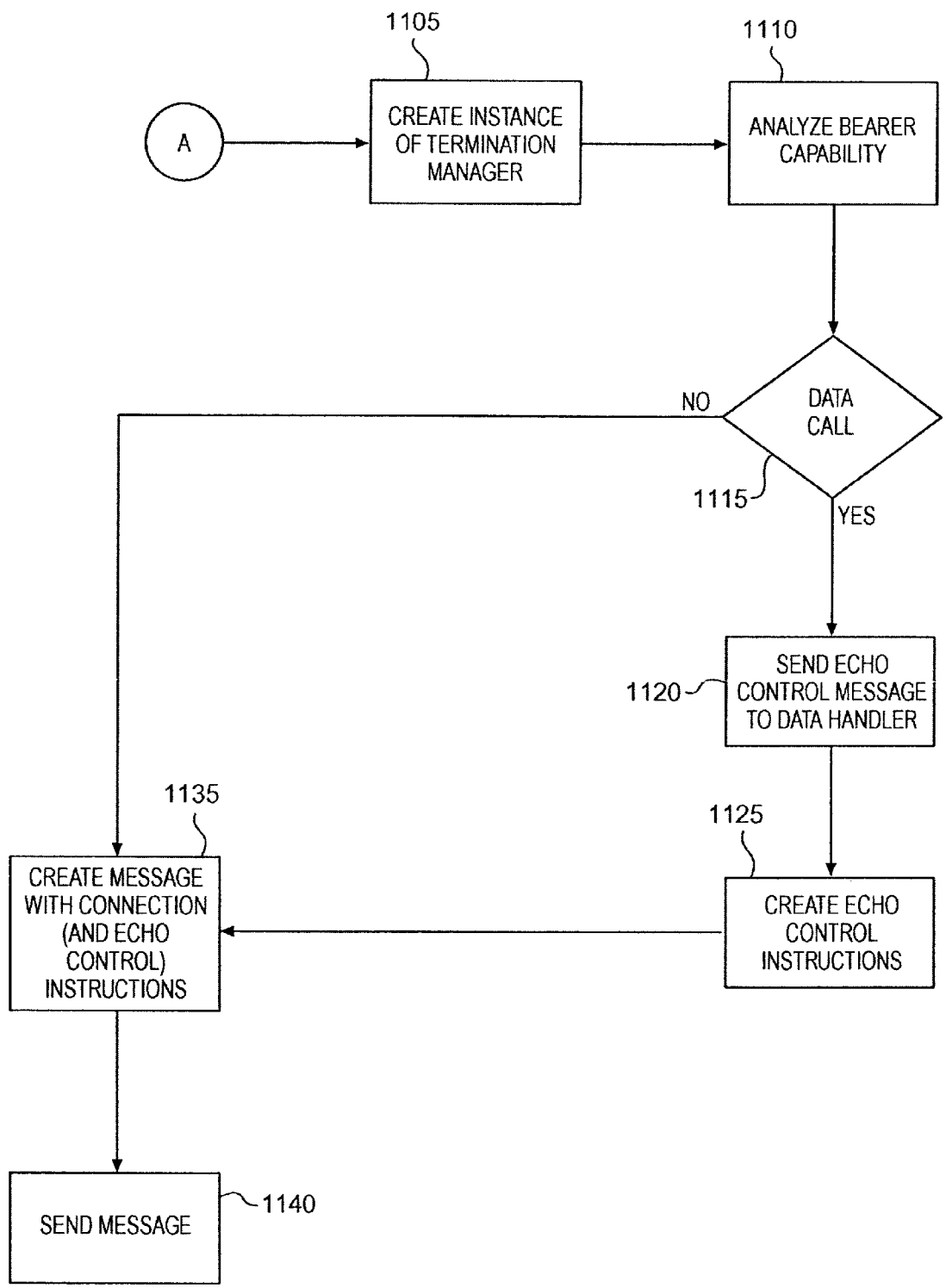
FIG. 11 depicts a flow diagram of a version of the invention.
Figure 12:
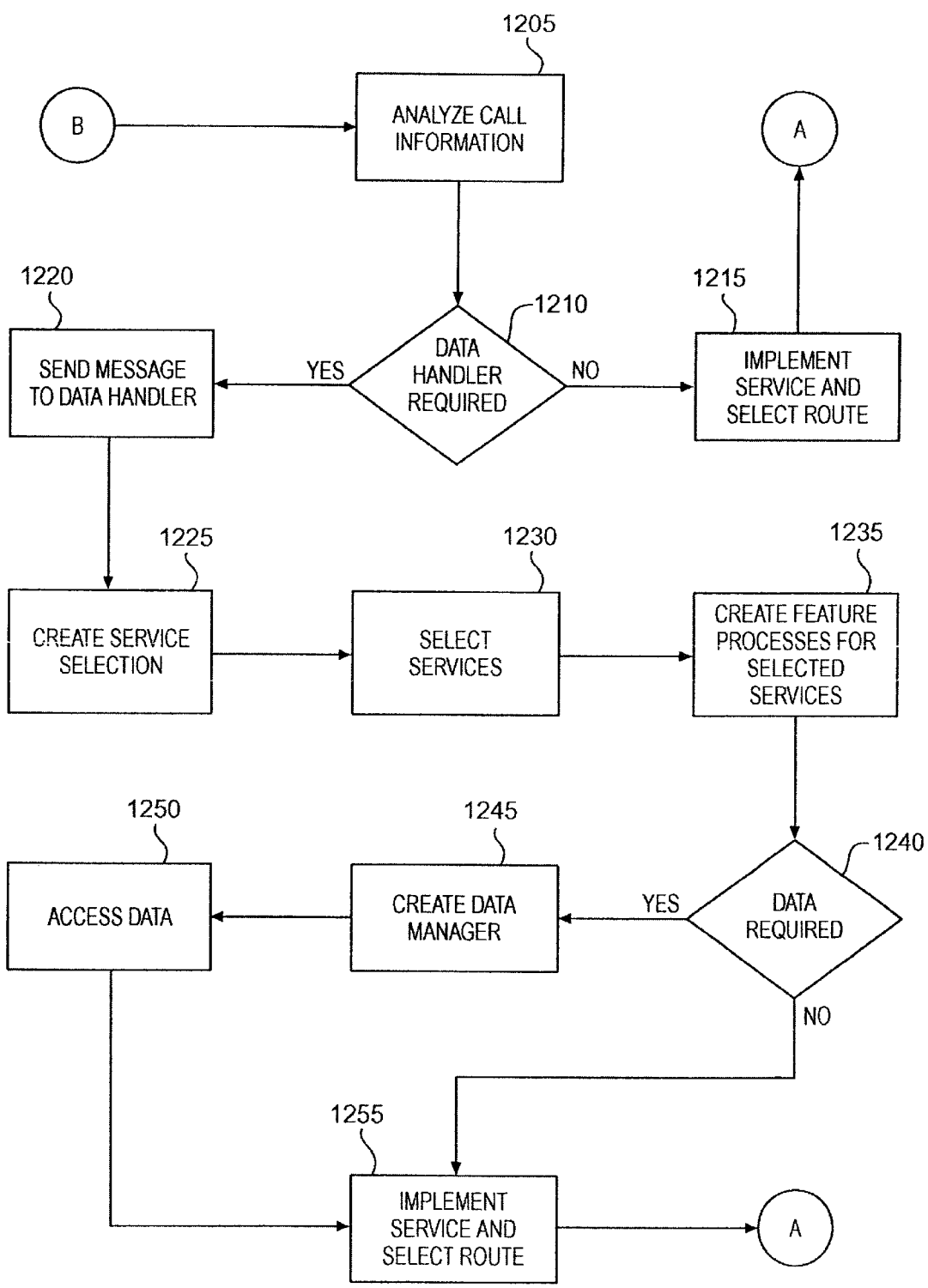
FIG. 12 depicts a flow diagram of a version of the invention.

In the preferred embodiment, call processing deviates from the basic call model recommended by the ITU, although strict adherence to the model could be achieved in other embodiments. FIGS. 10–12 depicts the preferred call processing. Referring first to FIG. 10, When the IAM for a call is received at 1005, the call center creates an instance of an origination manager at 1010.

The origination manager begins call processing by sending an authorize message to the detection point manager. Detection point manager checks IAM information, including the dialed number, the CIC, and the originating line information, to perform service discrimination at 1015. This is done to determine if the service requested requires validation at 1020. Current call processing systems and the BCSM of the ITU both validate the call before performing service discrimination. In a significant advance over the prior art, the preferred embodiment deviates from known call processing methods by looking at the IAM information prior to validation to determine if validation is even required. For example, the calling party may not pay the bill for a call. The called party pays the bill on 800 calls and validation can be unnecessary. If validation is not required at 1020, call processing proceeds directly to B. Advantageously, this avoids unnecessary look-ups in validation tables for a significant percentage of calls.

If validation is required at 1020, a validation table is checked at 1025. Validation checks to see if a call should be allowed and focuses on potential billing problems for the call. For example, calls from ANIs that are delinquent on payments pose problems for billing and may not be validated. Validation would entail messaging from the detection point manager through the feature manager and the switching manager to the local resource to access the tables. The table may list authorized ANIs, unauthorized ANIs, or both. If the call is not authorized at 1030, treatment (i.e. route to an operator or message) is given to the call at 1035.

If the call is authorized at 1030, the services identified at 1015 are checked at 1040 to determine if the call can be routed. This would typically occur for POTS calls. If no additional services are required at 1040, the dialed number is translated into a route instruction at 1045. The route instruction could be a particular virtual connection and/or access connections. The processing then proceeds to A. If additional services are required at 1040, processing proceeds to B.

FIG. 11 picks up processing at B after a route has been selected. A termination manager is created at 1105. The termination manager is responsible for processing in accordance with the terminating BCSM of the ITU. However, in some embodiments, the processing can exhibit some deviation. For example, detection points such as select facility and validate call may be skipped.

The bearer capability is analyzed at 1110 to determine if the call is a data call at 1115. This analysis could occur elsewhere in the call processing (i.e by the origination manager after the route is selected.) If a data call is found at 1115, an echo control message is sent to the data handler at 1120. Echo control instructions are created at 1125. The echo control instructions identify the connection for the call which requires echo control. The message could be sent to the echo control system over a conventional data link from the CCM to the echo control system. If, the echo control is implemented in the multiplexers, the echo control message could be included with the route instruction message.

If the call is not a data call at 1115 or after echo control processing at 1125, a signaling message is created at 1135. The new signaling message identifies the access connections and virtual connection for the call. The new signaling message can also contain echo control instructions. The new signaling message is sent to the platform handler at 1140.

FIG. 12 picks up the processing at B. At this point, several things are known about the call concerning authorization and service requirements. The call information is then analyzed at 1205 as required to apply services to the call. If the data handler is not required at 1210, the service is implemented and the route is selected at 1215. This may occur if a service can be directly implemented by the origination manager or through the local resource. For example, particular 800 translations or dialed number service profiles (i.e call forwarding) can be stored in the local resource. In this case, route selection would be performed by the local resource after the information is analyzed to identify the correct entry to a local resource database. When the local resource is used, the messages must be routed from the detection point processor through the feature manager and switching manager to the local resource.

If the data handler is required for the call at 1210, a message is sent to the data handler at 1220. The messaging typically flows from the detection point processor to the feature manager and switching manager to the data handler. Upon receipt of the message at the data handler, the service control center creates an instance of the service selection process at 1225. The service selection process analyzes the message from the detection point processor and selects the feature processes for the call at 1230. For example, a call may be placed from a caller in a virtual private network (VPN) to a PCS number. In this case, both a VPN feature process and a PCS feature process would be created.

Each feature process would determine if data was required at 1240. For example, a personal mobility feature process would need to access a database to locate the called party's current telephone number. If data is required at 1240, the service data center creates a service data manager at 1245. The data manager manages the data session and accesses the appropriate database at 1250. After the data is collected (or none is needed), the service is implemented by the feature process at 1255. For some features, i.e. 800 service, this may include route selection. The results of the feature process analysis are returned to the origination manager to assimilate. If the feature process does not provide the route, the origination manager must select the route using the local resource or another feature process.

The IAM itself contains numerous fields of information. The following table describes the elements of an IAM with regard to the information content and call processing.

TABLE 1

| Initial Address Message | |
|---|---|
| Parameter Field Name | Description |
| ROUTING LABEL | |
| Service Indicator | Set at 0101-ISDN user part |
| Priority | 0 or 1 based on destination |
| Network ID | 10 for national network or set based on international trunk group |
| Destination Point Code | Destination of IAM |
| Originating Point Code | Origination of IAM |
| Signaling Link Connection | Link used for messages (same for all messages for the call) |
| Circuit ID Code | Circuit used for the call between OPC and DPC in the IAM |
| Message Type | 0000 or 0001 for IAM |
| NATURE OF CONNECTION INDICATORS | |
| Satellite Indicator | Increment for each satellite used |
| Continuity Check Indicator | 00 - no check<br>01 - set up check and start COT timer<br>10 - start timer for COT message. |

TABLE 1-continued

| Initial Address Message | |
|---|---|
| Parameter Field Name | Description |
| Echo Suppresser Indicator | Indicates if echo control already implemented or is set if echo control is implemented |
| FORWARD CALL INDICATORS | |
| National/International Call Indicator | 0 for domestic<br>1 for international |
| End to End Method Indicator | Pass any information |
| Interworking Indicator | Pass any information |
| IAM Segmentation Indicator | 0 for POTS |
| ISDN User Part Indicator | Pass any information |
| ISDN Preference Indicator | Pass any information and default to 00 |
| ISDN Access Indicator | Pass any information |
| SCCP Method Indicator | 00 |
| CALLING PARTIES CATEGORY | |
| Calling Party Category | 00000000 for unknown<br>00001010 for ordinary caller<br>00001101 for test call |
| USER SERVICE INFORMATION | |
| Information Transfer Capability | Pass any information unless destination requires particular settings, but always pass ISDN "unrestricted digital information" |
| Coding Standard | 00 |
| Extension | 1 |
| Information Transfer Rate | Pass any information (will be 10000 for POTS) |
| Transfer Mode | Set at 00 for 64 kbit/sec |
| Extension | 1 |
| User Layer Protocol Indentification | Set based on rate adaption, typically 0100010 for user information layer 1 |
| Extension | 1 for normal calls<br>0 for rate adaption |
| Rate | Nothing for user information layer 1, but 0111 for other rate adaption |
| Extension | 1 |
| CALLED PARTY NUMBER | |
| Nature of Address Indicator | Identifies the type of call:<br>0000001 - original NPA or 950 call<br>0000011 - 1 + call<br>0000100 - direct dial international call<br>1110001 - operator call<br>1110010 - operator default<br>1110011 - international operator call<br>1110100 - long distance operator call<br>1110101 - cut through call<br>1110110 - 950, hotel/motel, or non equal access call<br>1110111 - test call |
| Odd/Even | number of digits in a called number |
| Numbering Plan | 000 - default<br>001 - for ISDN<br>101 - private |
| Digits Field | number of the called party |
| ACCESS TRANSPORT | |
| Access Transport Elements | pass any information |
| CALLING PARTY NUMBER | |
| Nature of Address Indicator | Indicates the type of calling party address, unique numbers can be used for billing, but the charge number is used for non-unique numbers:<br>0000000 - unknown<br>0000001 - unique caller number<br>0000011 - unique national number<br>0000100 - unique international number<br>1110001 - non-unique caller number<br>1110011 - non-unique national number<br>1110100 - non-unique international number |

TABLE 1-continued

Initial Address Message

| Parameter Field Name | Description |
|---|---|
| | 1110111 - test call |
| Odd/Even | Number of digits in the calling number |
| Screening | Not applicable |
| Presentation Allowed/Restricted | Pass any information for POTS, but restrict for N00 calls that are not allowed |
| Numbering Plan | 000 - default |
| | 001 - ISDN |
| | 101 - private |
| Digits Field | Number of the calling party |
| CARRIER IDENTIFICATION | |
| Network Identification Plan | Number of digits in identification code for the requested carrier |
| Type of Network Identification | Identifies the network numbering plan for the call - 010 for POTS call from LEC |
| Digit One | First digit in carrier identification code |
| Digit Two | Second digit in carrier identification code |
| Digit Three | Third digit in carrier identification code |
| Digit Four or Null | Fourth digit in carrier identification code (if there are four digits) |
| CARRIER SELECTION INFORMATION | |
| Carrier Selection Indicator | Indicates whether the carrier identification code was presubscribed or input |
| CHARGE NUMBER | |
| Nature of Address Indicator | This information may be used for billing. |
| | 00000001 - caller number |
| | 00000010 - no ANI, route to operator |
| | 00000011 - caller's national number |
| | 00000101 - route if 800, or route to operator |
| | 0000110 - no ANI |
| | 0000111 - route if 800 or route to operator |
| Odd/Even | Number of digits in calling number |
| Numbering Plan | Pass any information |
| Digits Field | The number of calling party |
| GENERIC ADDRESS | |
| Nature of Address Indicator | Pass any information |
| Odd/Even | Pass any information |
| Screening | Pass any information |
| Presentation Allowed/Restricted | Pass any information |
| Numbering Plan | Pass any information |
| Digits Field | Pass any information |
| ORIGINATING LINE INFORMATION | |
| Originating Line Information | Identifies particular types of calls, for example: |
| | 00000000 - normal call |
| | 00000111 - call from a restricted phone |
| | 00111111 - call from a cellular roamer |
| ORIGINAL CALLED NUMBER | |
| Nature of address Indicator | Pass any information |
| Odd/Even | Pass any information |
| Screening | Pass any information |
| Presentation Allowed/Restricted | Pass any information |
| Numbering Plan | Pass any information |
| Digits Field | Pass any information |
| REDIRECTING NUMBER | |
| Nature of Address Indicator | Pass any information |
| Odd/Even | Pass any information |
| Screening | Pass any information |
| Presentation Allowed/Restricted | Pass any information |
| Numbering Plan | Pass any information |
| Digits Field | Pass any information |
| REDIRECTION INFORMATION | |
| Redirection Indicator | Pass any information |
| Original Redirecting Reason | Pass any information |
| Redirection Counter | Pass any information |
| Redirection Reason | Pass any information |
| SERVICE CODE | |
| Service Code | Pass any information |
| TRANSIT NETWORK SELECTION | |
| Network Identification Plan | Identifies the number of digits in the carrier identification code (3 or 4) |
| Type of Network Identification | Type of network identification for transit network parameter |
| Digits 1, 2, 3, 4 | Carrier identification code of the international transit carrier |
| Circuit Code | Indicates how the call was dialed: |
| | 0001 - international call, no operator requested |
| | 0010 - international call, operator requested |
| HOP COUNTER | |
| Hop Counter | limits the number of times an IAM may transfer through a signaling point. If the count reaches the limit, release the call |

Subsequent ISUP Message Processing

The processing of the IAM is discussed above. Those skilled in the art are will appreciate how other SS7 messages can be incorporated into the processing of the present invention. For example, the time an address complete message (ACM) is received is recorded in the call control block for billing and maintenance. Triggers can also be based on receipt of subsequent messages, such as the ACM. The process for the answer message (ANM) is much the same.

Cut-through is the time point at which the users are able to pass information along the call connection from end to end. Messages from the CCM to the appropriate network elements are required to allow for cut-through of the call. Typically, call connections include both a transmit path from the caller and a receive path to the caller, and cut through is allowed on the receive path after the ACM is received and on the transmit path after the ANM is received.

Upon receipt of a release (REL) message, the CCM will write a time for the message to the call control block and check for triggers upon release (such as call re-originate). Additionally, any disabled echo canceller will be re-enabled, and the call control block will be used to create a billing record. Upon the receipt of a release complete message (RLC), the CCM will transmit messages directing tear down of the call path. It will clear its call specific processes and reuse the call connections for subsequent calls.

Additionally, suspend messages (SUS) and pass along messages (PAM) may be processed by the CCM. A suspend message (SUS) indicates that the called party has disconnected and a REL will follow if the called party does not re-connect with a specified time. A PAM is simply a message between signaling points and can contain a variety of information and be used for a variety of purposes.

The invention allows switching over an ATM fabric on a call by call basis. This allows efficient high capacity virtual connections to be exploited. Advantageously, the invention does not require signaling capability in an ATM switch. The invention does not require call processing capability in an ATM switch. This enables networks to implement ATM switching without these sophisticated ATM switches that support high volumes of calls. It also avoids the cost of these switches. The invention fully supports voice traffic and non-voice traffic. The invention supports services, such as N00, VPN, personal/terminal mobility, and voice messaging without requiring the service capability in an ATM switch. Relying on ATM cross-connects is advantageous because ATM cross-connects are farther advanced than ATM switches, and the cross-connects require less administrative support.

Those skilled in the art will appreciate that variations from the specific embodiments disclosed above are contemplated by the invention. The invention should not be restricted to the above embodiments, but should be measured by the following claims.

I claim:

1. A telecommunication signal embodied in a tangible medium, the telecommunication signal comprising:
   a first signal component including user information from a narrowband communication signal; and
   a second signal component including an identifier for routing the user information, wherein the identifier is selected by processing a signaling message, wherein an interworking device receives the narrowband communication signal and a control signal indicating the narrowband communication signal and the identifier, and in response to the control signal, converts the narrowband communication signal into a packet format having the first signal component including the user information and the second signal component including the identifier to form the telecommunication signal.

2. The telecommunication signal of claim 1 wherein the user information comprises echo-cancelled communications.

3. The telecommunication signal of claim 1 wherein the user information comprises encrypted communications.

4. The telecommunication signal of claim 1 wherein the user information comprises compressed communications.

5. The telecommunication signal of claim 1 wherein the identifier comprises an asynchronous transfer mode virtual identifier.

6. The telecommunication signal of claim 1 wherein the identifier is selected by processing an Initial Address Message (IAM).

7. The telecommunication signal of claim 1 wherein the identifier is selected by processing a called number.

8. The telecommunication signal of claim 1 wherein the narrowband communication signal comprises a DS0 communication signal.

9. The telecommunication signal of claim 1 wherein the tangible medium is an optical medium.

10. A control signal embodied in a tangible medium, the control signal comprising:
    a first signal component indicating a narrowband communication signal having user information; and
    a second signal component indicating an identifier for routing the user information, wherein the identifier is selected by processing a signaling message, wherein an interworking device receives the narrowband communication signal and the control signal indicating the narrowband communication signal and the identifier, and in response to the control signal, converts the narrowband communication signal into a packet format having the user information and the identifier to form a telecommunication signal.

11. The control signal of claim 10 further comprising a third signal component indicating an echo cancellation instruction.

12. The control signal of claim 10 further comprising a third signal component indicating an encryption instruction.

13. The control signal of claim 10 further comprising a third signal component indicating a compression instruction.

14. The control signal of claim 10 wherein the identifier comprises an asynchronous transfer mode virtual identifier.

15. The control signal of claim 10 wherein the identifier is selected by processing an Initial Address Message (IAM).

16. The control signal of claim 10 wherein the identifier is selected by processing a called number.

17. The control signal of claim 10 wherein the narrowband communication signal comprises a DS0 communication signal.

18. The control signal of claim 10 wherein the control signal comprises an Internet Protocol message.

19. A method of transferring a telecommunication signal, the method comprising:
    transferring a first signal component including user information from a narrowband communication signal; and
    transferring a second signal component including an identifier for routing the user information, wherein the identifier is selected by processing a signaling message, wherein an interworking device receives the narrowband communication signal and a control signal indicating the narrowband communication signal and the identifier, and in response to the control signal, converts the narrowband communication signal into a packet format having the first signal component including the user information and the second signal component including the identifier to form the telecommunication signal.

20. The method of claim 19 wherein the user information comprises echo-cancelled communications.

21. The method of claim 19 wherein the user information comprises encrypted communications.

22. The method of claim 19 wherein the user information comprises compressed communications.

23. The method of claim 19 wherein the identifier comprises an asynchronous transfer mode virtual identifier.

24. The method of claim 19 wherein the identifier is selected by processing an Initial Address Message (IAM).

25. The method of claim 19 wherein the identifier is selected by processing a called number.

26. The method of claim 19 wherein the narrowband communication signal comprises a DS0 communication signal.

27. The method of claim 19 wherein transferring the telecommunication signal comprises transferring the telecommunication signal over an optical medium.

28. A method of transferring a control signal, the method comprising:
    transferring a first signal component indicating a narrowband communication signal having user information; and
    transferring a second signal component indicating an identifier for routing the user information, wherein the identifier is selected by processing a signaling message, wherein an interworking device receives the narrowband communication signal and the control signal indicating the narrowband communication signal and the identifier, and in response to the control signal, converts the narrowband communication signal into a packet format having the user information and the identifier to form a telecommunication signal.

29. The method of claim 28 further comprising transferring a third signal component indicating an echo cancellation instruction.

30. The method of claim 28 further comprising transferring a third signal component indicating an encryption instruction.

31. The method of claim 28 further comprising transferring a third signal component indicating a compression instruction.

32. The method of claim 28 wherein to identifier comprises an asynchronous transfer mode virtual identifier.

33. The method of claim 28 wherein the identifier is selected by processing an Initial Address Message (IAM).

34. The method of claim 28 wherein the identifier is selected by processing a called number.

35. The method of claim 28 wherein the narrowband communication signal comprises a DS0 communication signal.

36. The method of claim 28 wherein the control signal comprises an Internet Protocol message.

* * * * *

UNITED STATES PATENT AND TRADEMARK OFFICE
CERTIFICATE OF CORRECTION

PATENT NO. : 6,665,294 B2  Page 1 of 1
DATED : December 16, 2003
INVENTOR(S) : Joseph Michael Christie It is certified that error appears in the above-identified patent and that said Letters Patent is hereby corrected as shown below:

Title page,
Item [63], Related U.S. Application Data, replace "Continuation of application No. 09/438,669, filed on Nov. 12, 1999, now Pat. No. 6,452,928, which is a continuation-in-part of application No. 08/568,551, filed on Dec. 7, 1995, now Pat. No. 5,825,780, and a continuation of application No. 08/525,897, filed on Sep. 8, 1995, now Pat. No. 5,991,301, and a continuation of application No. 08/238,605, filed on May 5, 1994, now abandoned."
with -- Continuation of application No. 09/438,669, filed on Nov. 12, 1999, now Pat. No. 6,452,928, which is a continuation of application No. 08/525,897, filed on Sep. 8, 1995, now Pat. No. 5,991,301, which is a continuation-in-part of application No. 08/238,605, filed on May 5, 1994, now abandoned. --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,665,294 B2
DATED : December 16, 2003
INVENTOR(S) : Joseph Michael Christie It is certified that error appears in the above-identified patent and that said Letters Patent is hereby corrected as shown below:

Title page,
Item [63], Related U.S. Application Data, replace "Continuation of Application No. 09/438,669, filed on Nov. 12, 1999, now Pat. No. 6,452,928, which is a continuation of application No. 08/525,897, filed on Sep. 8, 1995, now Pat. No. 5,991,301, which is a continuation-in-part of application No. 08/238,605, filed on May 5, 1994, now abandoned."
with -- Continuation of application No. 09/438,669, filed on Nov. 12, 1999, now Pat. No. 6,452,928, which is a continuation of application No. 08/525,897, filed on Sep. 8, 1995, now Pat. No. 5,991,301. --

Signed and Sealed this

Fifteenth Day of February, 2005

JON W. DUDAS
*Director of the United States Patent and Trademark Office*